(12) United States Patent
Yun et al.

(10) Patent No.: US 11,573,663 B1
(45) Date of Patent: Feb. 7, 2023

(54) OPEN CLOSE DETECTION OF FOLDABLE PHONE LID ANGLE CALCULATION

(71) Applicant: STMicroelectronics Asia Pacific Pte Ltd., Singapore (SG)

(72) Inventors: Chan Hyuck Yun, Yongin-si (KR); Min Sang Kim, Anyang-si (KR)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 17/648,646

(22) Filed: Jan. 21, 2022

(51) Int. Cl.
*G06F 3/041* (2006.01)
*G06F 3/044* (2006.01)
*G06F 1/16* (2006.01)

(52) U.S. Cl.
CPC ........ *G06F 3/04166* (2019.05); *G06F 1/1641* (2013.01); *G06F 1/1652* (2013.01); *G06F 3/044* (2013.01); *G06F 2203/04102* (2013.01)

(58) Field of Classification Search
CPC .................. G06F 1/1641; G06F 1/1652; G06F 3/04166; G06F 3/044; G06F 2203/04102
See application file for complete search history.

(56) References Cited

U.S. PATENT DOCUMENTS

| | | | |
|---|---|---|---|
| 8,928,619 B1 | 1/2015 | Cho | |
| 9,569,018 B2 * | 2/2017 | Kang | G06F 3/03 |
| 10,444,917 B2 * | 10/2019 | Seo | G06F 3/0447 |
| 10,528,088 B2 * | 1/2020 | Whitman | G06F 1/1618 |
| 10,558,277 B2 | 2/2020 | Henell | |
| 10,691,243 B2 * | 6/2020 | Hei | G06F 3/0443 |
| 10,754,483 B2 * | 8/2020 | Seo | G06F 3/04166 |
| 10,901,465 B2 * | 1/2021 | Wu | G01L 1/22 |
| 11,209,914 B1 * | 12/2021 | Hu | G06F 3/0346 |
| 2013/0100053 A1 * | 4/2013 | Kang | G06F 3/0445 345/173 |
| 2015/0338888 A1 | 11/2015 | Kim et al. | |
| 2015/0378557 A1 | 12/2015 | Jeong et al. | |
| 2016/0070305 A1 | 3/2016 | Kim et al. | |
| 2017/0097660 A1 | 4/2017 | Alonso et al. | |
| 2018/0039339 A1 | 2/2018 | Henell | |
| 2018/0059822 A1 * | 3/2018 | Seo | G06F 1/1652 |
| 2018/0088633 A1 * | 3/2018 | Whitman | G06F 1/1677 |
| 2019/0042042 A1 * | 2/2019 | Hei | G06F 3/0445 |
| 2020/0012367 A1 * | 1/2020 | Seo | G06F 3/0447 |
| 2020/0073446 A1 * | 3/2020 | Wu | G01L 1/22 |
| 2021/0405773 A1 * | 12/2021 | Hu | G06F 1/1616 |
| 2022/0058363 A1 * | 2/2022 | Moon | G06K 9/6215 |

\* cited by examiner

*Primary Examiner* — Michael Pervan
(74) *Attorney, Agent, or Firm* — Slater Matsil, LLP

(57) ABSTRACT

A method for operating an electronic device includes rotating a first portion of a flexible touchscreen with respect to a second portion of the flexible touchscreen around a folding axis; detecting, self-capacitances sensed in a folding area of the flexible touchscreen using a self-sensing scan, where a first side of the folding area is on the first portion of the flexible touchscreen and a second side of the folding area is on the second portion of the flexible touchscreen, and the first side and the second side are separated by a folding axis; determining, a current strength sensed by the flexible touchscreen in the folding area based on the self-capacitances in the folding area; and determining, a folding angle of the first portion of the flexible touchscreen with the second portion of the flexible touchscreen around the folding axis based on the current strength in the folding area.

19 Claims, 15 Drawing Sheets

OPEN CLOSE DETECTION OF FOLDABLE PHONE LID ANGLE CALCULATION

TECHNICAL FIELD

The present invention relates generally to a system and method for operating an electronic device including a flexible touchscreen.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

With the development of flexible displays that are capable of being folded, the size of a display may be increased without increasing the size of the device. However foldable displays come with their own set of advantages and disadvantages. Foldable displays require additional components such as hall sensors to detect the angle at which the flexible touchscreen is folded (i.e. to determine whether the touchscreen is open or closed) which increases the power consumption of the electronic device.

SUMMARY

In accordance with an embodiment of the present invention, a method for operating an electronic device includes rotating a first portion of a flexible touchscreen with respect to a second portion of the flexible touchscreen around a folding axis; detecting, by a touchscreen controller, self-capacitances sensed in a folding area of the flexible touchscreen using a self-sensing scan, where a first side of the folding area is on the first portion of the flexible touchscreen and a second side of the folding area is on the second portion of the flexible touchscreen, and the first side and the second side are separated by a folding axis; determining, by the touchscreen controller, a current strength sensed by the flexible touchscreen in the folding area based on the self-capacitances in the folding area; and determining, by the touchscreen controller, a folding angle of the first portion of the flexible touchscreen with the second portion of the flexible touchscreen around the folding axis based on the current strength in the folding area.

In accordance with an embodiment of the present invention, a method for operating an electronic device includes determining, by a touchscreen controller, a baseline capacitive strength of a flexible touchscreen, the baseline capacitive strength being indicative of equal capacitances sensed by the flexible touchscreen prior to the touchscreen controller performing sensing scans to detect touch by the flexible touchscreen; determining, by the touchscreen controller, a capacitive strength sensed by the flexible touchscreen across a folding axis of the flexible touchscreen based on the baseline capacitive strength, the capacitive strength being indicative of self-capacitances sensed by the flexible touchscreen across the folding axis during a self-sensing scan; determining whether the capacitive strength is greater than a threshold capacitive strength indicative of a maximum allowable folding angle of the flexible touchscreen; and in response to determining the capacitive strength is greater than the threshold capacitive strength, determining, by the touchscreen controller, the folding angle of the flexible touchscreen based on the capacitive strength.

In accordance with an embodiment of the present invention, a device includes a flexible touchscreen including a first portion and a second portion, the first portion configured to be rotated with respect to the second portion around a folding axis positioned within a folding area, where a first side of the folding area is on the first portion of the flexible touchscreen and a second side of the folding area is on the second portion of the flexible touchscreen, and the first side and the second side are separated by the folding axis; a controller; and a memory for storing a program to be executed in the controller, the program including instructions when executed cause the controller to: detect self-capacitances sensed in the folding area using a self-sensing scan; determine a current strength sensed by the flexible touchscreen in the folding area based on the self-capacitances in the folding area; and determine a folding angle of the first portion of the flexible touchscreen with the second portion of the flexible touchscreen around the folding axis based on the current strength in the folding area.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1F illustrate an electronic device having a flexible touchscreen in accordance with an embodiment of the present application, wherein FIG. 1A illustrates a schematic view of the electronic device in a fully open position, FIG. 1B illustrates a schematic view of the electronic device in a partially open position, FIG. 1C illustrates a schematic view of the electronic device in a fully closed position, FIG. 1D illustrates a component schematic of the electronic device, FIG. 1E illustrates a component schematic of the flexible touch screen and FIG. 1F illustrates a component schematic of a touch sensing layer of the flexible touchscreen;

FIGS. 2A-2B illustrates exemplary capacitive strengths detected by an electronic device in accordance with an embodiment of the present application, wherein FIG. 2A illustrates an exemplary electronic readout of capacitive strengths detected by the electronic device, and FIG. 2B illustrates a graphical representation of the self-capacitive strengths sensed by the sense lines and drive lines of the flexible touchscreen in a folding area;

FIGS. 4A-4C illustrate graphical representations for determining the folding angle of the flexible touchscreen based on capacitive strengths sensed in the folding area of the touchscreen in accordance with an embodiment of the present application, wherein FIG. 4A illustrates a graphical representation of self-sense raw data detected in the foldable area mapped to respective folding angles, FIG. 4B illustrates a graphical representation of capacitive strengths sensed in the folding area mapped to respective folding angles, FIG. 4C illustrates a graphical representation of determining a folding angle of the flexible touchscreen from the capacitive detected in the folding area based on mappings of known capacitive strengths in the folding area;

FIGS. 8A-8B illustrate schematic views of the process steps for determining the capacitive strengths sensed by the flexible touchscreen based on baseline strengths of the flexible touchscreen based on pure raw data in accordance with an embodiment of the present application, wherein FIG. 8A illustrates schematic views of the process steps for autotuning the flexible touchscreen to determine pure raw data, and FIG. 8B illustrates a graphical representation for determining capacitive strengths sensed in the folding area based on the pure raw data;

DETAILED DESCRIPTION OF ILLUSTRATIVE EMBODIMENTS

While foldable displays have led to great advances in the evolution of portable electronic devices, due to their delicate nature there are still limitations that exist. Namely, foldable displays capable of being enlarged by unfolding and reduced by folding require additional electrical components, such as hall sensors, to detect the folding angle which can lead to an increase in power consumption, and an increase in manufacturing costs.

Embodiments of the present application relate to determining the folding angle of a flexible touchscreen without the use of any additional electronic components. Particularly, embodiments of the present application relate to determining a folding angle of a flexible touchscreen based on self-capacitances sensed by the flexible touchscreen as a first portion of the flexible touchscreen is rotated (e.g. folded) towards a second portion of the flexible touchscreen.

Figure 1A:
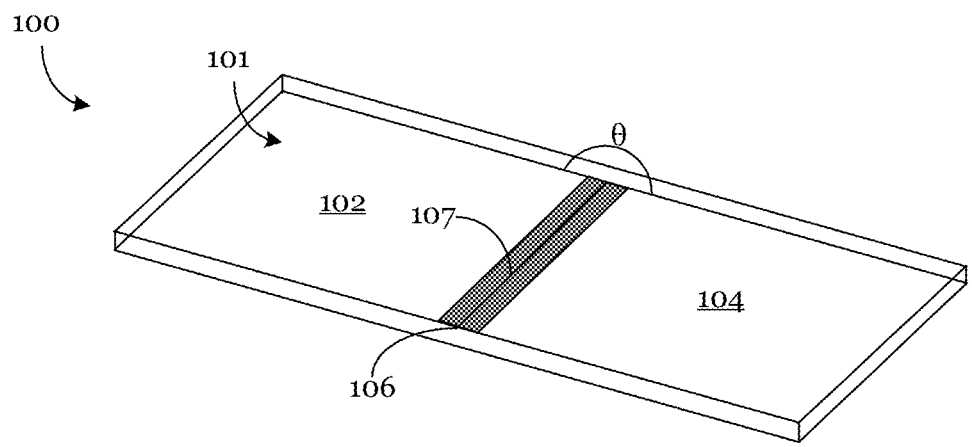
Figure 1B:
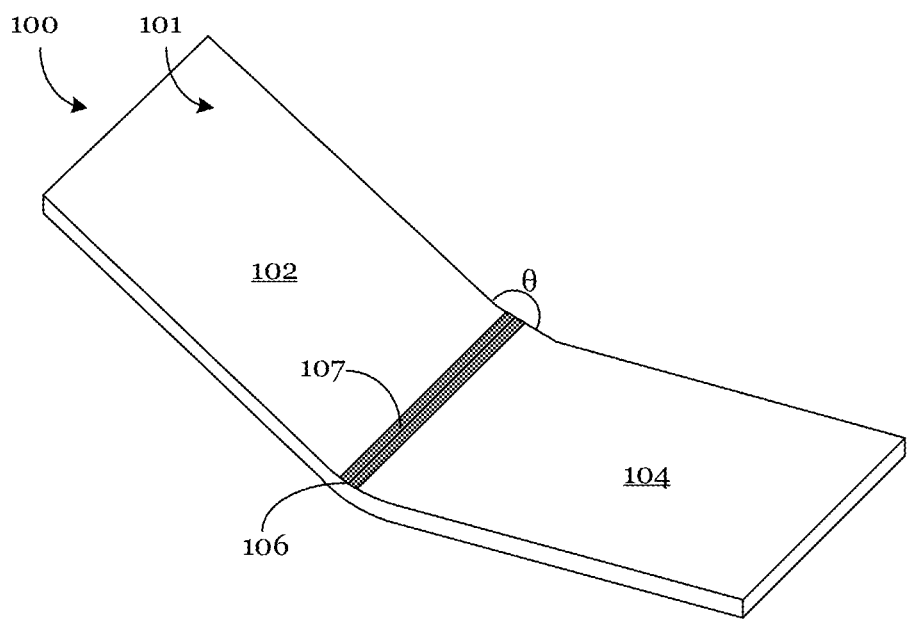
Figure 1C:
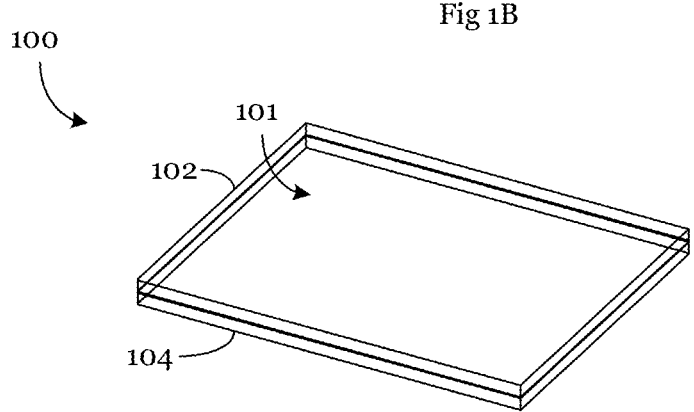
Figure 1D:
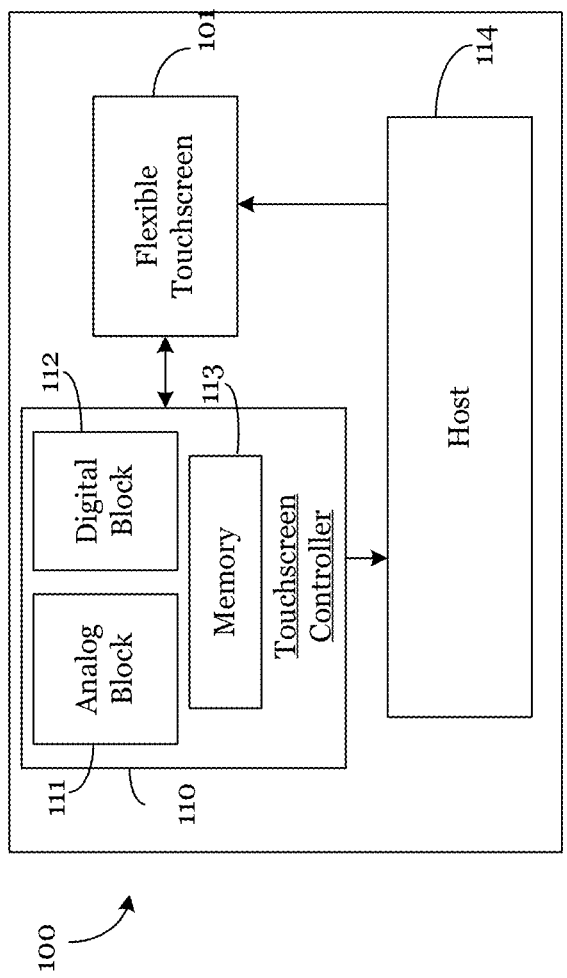
Figure 1E:
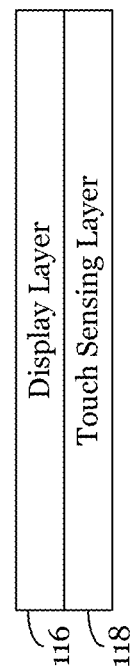
Figure 1F:
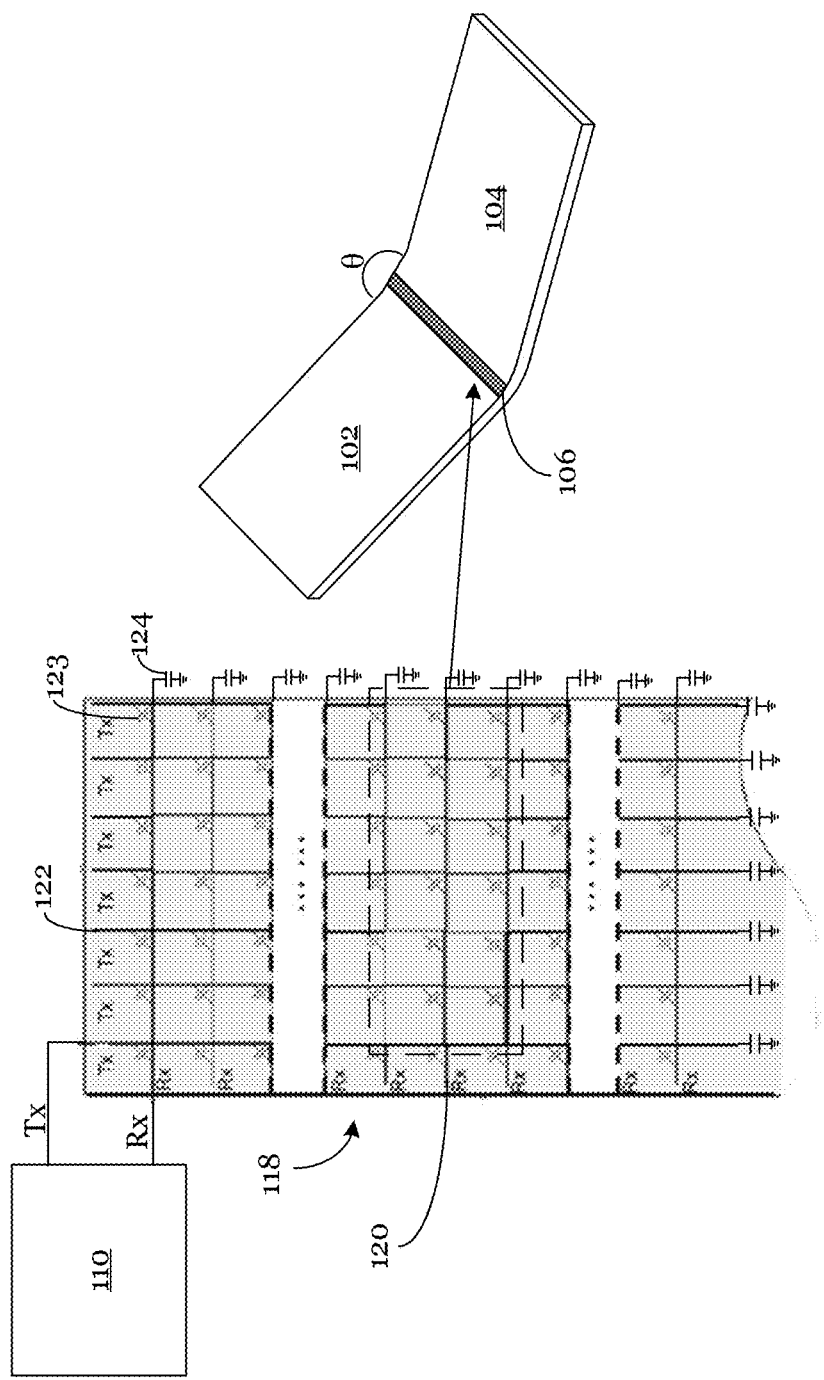

FIGS. 1A-1F illustrate an electronic device having a flexible touchscreen in accordance with an embodiment of the present application, wherein FIG. 1A illustrates a schematic view of the electronic device in a fully open position, FIG. 1B illustrates a schematic view of the electronic device in a partially open position, FIG. 1C illustrates a schematic view of the electronic device in a fully closed position, FIG. 1D illustrates a component schematic of the electronic device, FIG. 1E illustrates a component schematic of the flexible touch screen, and FIG. 1F illustrates a component schematic of a touch sensing layer of the flexible touchscreen.

FIG. 1A illustrates a schematic detailing an embodiment of an electronic device 100 configured with a flexible touchscreen 101. The electronic device may be a mobile phone, tablet, gaming system, or the like.

In various embodiments, the flexible touchscreen 101 may comprise a first portion 102, a second portion 104, and a folding area 106. The flexible touchscreen 101 may comprise a light emitting diode (LED) flexible display, organic LED flexible display, or any other type of flexible touchscreen 101. The flexible touchscreen 101 may be configured to be folded or unfolded by rotating the first portion towards or away from the second portion 104 along a folding axis 107 within the folding area 106. One side of the folding area 106 may be on the first portion 102 while the other side of the folding area 106 may be on the second portion 104. The sides of the folding area 106 may be separated by the folding axis 107. The folding axis 107 may include a foldable element such as a hinge element. In other words, the folding axis 107 may include any element that allows the first portion 102 to be rotated with respect to the second portion 104 (and vice versa). For example, the first portion 102 and the second portion 104 may be separate elements coupled by the folding area 106 or may be formed as a single body.

The flexible touchscreen 101 may be configured to be rotated to a folding angle $\theta$. The folding angle $\theta$ may be defined as the angle between the first portion 102 and the second portion 104 around the folding axis 107. In other words, the folding axis 107 may allow various degrees of rotation between the first portion 102 and the second portion 104. In various embodiments, the flexible touchscreen 101 may be configured to be rotated between any angle between a completely unfolded position shown in FIG. 1A to a completely folded position shown in FIG. 1C. In other words, the folding angle $\theta$ may range from 180 degrees (e.g. the open position) to 0 degrees (e.g. the closed position). Alternatively, the folding angle $\theta$ may range from 0 degrees to 360 degrees.

FIG. 1B illustrates the flexible touchscreen 101 in in a partially folded position where the first portion 102 is partially rotated towards the second portion 104 around the folding area 106.

FIG. 1C illustrates the flexible touchscreen in a fully folded position in which the first portion 102 is rotated and contacting the second portion 104.

In the illustrations shown in FIGS. 1A-1C, the electronic device 100 is oriented so that the flexible touchscreen 101 is configured to be rotated across its width. In other words, the folding area 106 is across the width of the flexible touchscreen 101. This is known as flip mode. In other embodiments of the electronic device 100, the electronic device 100 may be oriented so that the flexible touchscreen 101 is configured to be rotated across its length. This is known as fold mode.

To monitor and determine the folding angle $\theta$ of the flexible touchscreen 101, embodiments as next described analyze touch sensing data sensed by the flexible touchscreen 101 in the folding area 106. In various embodiments, the electronic device may determine a linear relationship between known folding angles $\theta$ and the corresponding touch sensing data sensed in the folding area 106. Then using that relationship, the electronic device wo may determine the folding angle $\theta$. Advantageously, the electronic device 100 may determine the folding angle $\theta$ without adding any additional electronic components. In other words, the touch sensing data sensed by the flexible touchscreen 101 during a self-sensing scan in the folding area 106 may be analyzed by converting it to the strength domain. Then, the folding angle $\theta$ may be determined using the converted touch sensing data and the slope between at least two previously known folding angles $\theta$.

FIG. 1D illustrates a component schematic of the electronic device.

Referring to FIG. 1D, the electronic device 100 may include a touchscreen controller no, the flexible touchscreen 101, and a host 114 that may be coupled to each other through a bus. The electronic device 100 may be a smart phone, a GPS device, a tablet computer, a mobile media player, a laptop, a gaming system, a personal computer, or any other electronic device that may utilize a flexible touchscreen 101.

In various embodiments, host 114, may also be known as a system on chip and may comprise a processor, interface, circuitry, and/or the like configured to direct the flow of input and output data to the flexible touchscreen 101 and the associated touchscreen controller no. A memory may be integrated onto the host 114. The memory may be programmed for short term and/or long term memory storage. The memory may comprise various programs to be executed in the host 114. The memory may include both volatile and non-volatile memories.

The touchscreen controller no may perform various methods with respect to the flexible touchscreen 101. In various embodiments, the touchscreen controller no may analyze information and carry out a series of firmware (FW) algorithms based on user input. In various embodiments, the touchscreen controller no may include, an analog block 111, a digital block 112 and a memory 113 operable by a processor. The analog block 111 may include a plurality of analog circuits configured to measure capacitances across the flexible touchscreen 101 and convert them into digital values. The digital block 112 may comprise a variety of digital logic circuits such as DACs or digital control systems configured to obtain digital touch data from the analog block in, process the digital touch data and store them into memory 113.

In various embodiments, the memory 113 may be programmed for short term and/or long term memory storage. The memory 113 may be configured to store data generated by the touchscreen controller no and may comprise various programs to be executed in the touchscreen controller no. The memory 113 may include both volatile and non-volatile memories.

In one or more embodiments, the processor may comprise an application-specific integrated circuit (ASIC) device, a central processing unit (CPU), or an Advanced RISC Machine (ARM) core, or any other processing unit known in the art. In various embodiments, the touchscreen controller no may comprise a number of separate computing units such as cores integrated within one processor, or distinct separate processing chips.

The flexible touchscreen 101 is designed to register user input via touches made to its surface. The electronic device 100 may also be configured to detect input from the flexible touchscreen 101 that may also come from input given from a stylus (active or passive) device. In various embodiments, the flexible touchscreen 101 may include sensors such as gyroscopes or accelerometers. One or more of these sensors may be integrated together.

The host 114 may be configured to transmit image data to the flexible touchscreen 101 to be displayed on the flexible touchscreen 101 based on the folding angle θ. The folding angle θ may be transmitted by the touchscreen controller no to the host 114. In various embodiments, the touchscreen controller no may be configured to perform mutual and self-sensing scans to the detect the amount of change in strength of mutual and self-capacitances and based thereon calculate and report the folding angle θ to the host 114.

FIG. 1E illustrates a schematic of the flexible touchscreen 101. In various embodiments the flexible touchscreen 101 may include a touch sensing layer 118 and a display layer 116. The touch sensing layer 118 and the display layer 116 may be situated on the front facing side of the electronic device 100. The display layer 116 may comprise a light emitting diode (LED) display, organic LED display, LCD, AMOLED, or any other type of display.

FIG. 1F illustrates a schematic of the touch sensing layer 118. In various embodiments, the touch sensing layer 118 may comprise drive lines 122 and sense lines 120 that span the entirety of the flexible touchscreen 101 in a grid-like fashion that are operable by the touchscreen controller no. In various embodiments, the drive lines 122 may be formed in columns across the flexible touchscreen 101 and the sense lines 120 may be formed in rows across the flexible touchscreen 1o1 (or vice versa). The number of drive and sense lines used are not limited by this application.

The drive lines 122 and the sense lines 120 may overlap in certain embodiments. While FIG. 1F depicts the drive lines 122 and the sense lines 120 overlapping in an orthogonal manner, they may overlap other than orthogonally such as being interleaved or at various angles.

The drive lines 122 and the sense lines 120 may have a measurable mutual capacitance at their intersections as to form a matrix of mutual capacitors with mutual capacitances 123.

As appreciated by those with ordinary skill in the art, each of the drive lines 122 and the sense lines 120 may also have a self-capacitance 124 that is measurable. In other words, the drive lines 122 and the sense lines 120 are operable in mutual sensing mode and a self-sensing mode. More information regarding the using the facets of mutual sensing scans, and self-sensing scans to determine the folding angle θ of the flexible touchscreen 101 will be described further below.

Figure 2A:
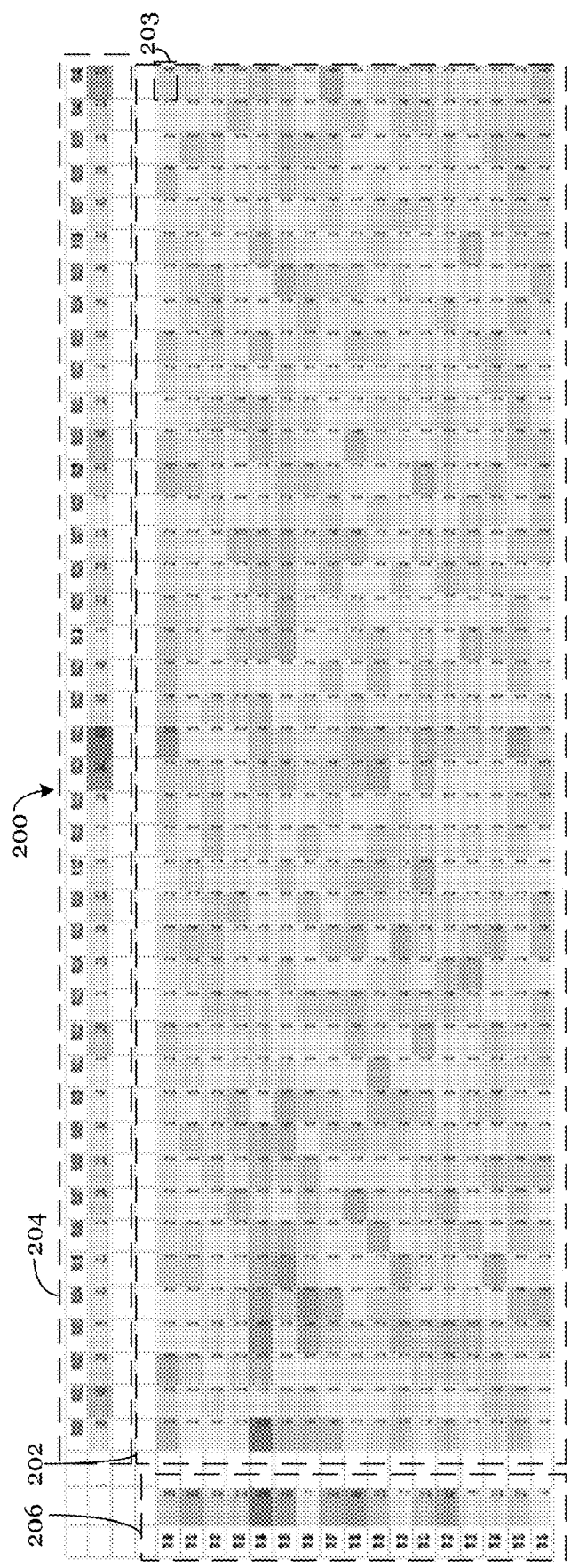
Figure 2B:
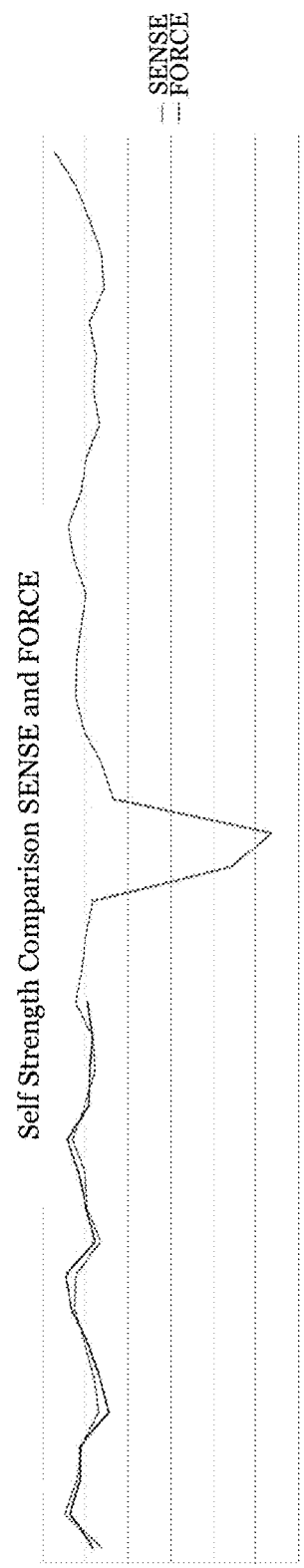

FIGS. 2A-2B illustrates exemplary capacitive strengths detected by an electronic device in accordance with an embodiment of the present application, wherein FIG. 2A illustrates an exemplary electronic readout of capacitive strengths detected by the electronic device, and FIG. 2B illustrates a graphical representation of the self-capacitive strengths sensed by the sense lines and drive lines of the flexible touchscreen in a folding area.

FIG. 2A illustrates an exemplary electronic readout 200 of capacitive strengths detected by the electronic device 100 that includes strengths detected from a mutual sensing scan and a self-sensing scan.

According to an embodiment of the invention, the strength values 203 pertain to capacitive-based information generated from the sense lines 120 and the drive lines 122.

The electronic readout 200 comprises strength values 203 arranged as mutual strengths 202, self-sense strengths 204, and self-force strengths 206.

The mutual strengths 202 are arranged in a matrix like fashion. In one or more embodiments, the mutual sensing process includes the touchscreen controller no selecting and driving a particular row of the drive lines 122 with a voltage and scanning every column of the sense lines 120. In this manner, the change in the mutual capacitance 123 at each intersection between a respective driven drive line 122 and sense line 120 is measured, resulting in mutual sensing raw data. This process is repeated sequentially for each drive line 122 to determine the rest of the mutual sensing raw data. Then, after determining each value of the mutual sensing raw data, each value of the mutual sensing raw data may be subtracted from a corresponding baseline strength, resulting in mutual strengths 202.

In other words, during the mutual sensing scan when a row of the drive lines 122 are driven, electric fields form between adjacent electrodes of the driven drives line and the respective intersecting columns of the sense lines 120. When capacitive objects such as human fingers or a stylus, touch the flexible touchscreen 101, the electric field lines going through the air between adjacent lines is replaced to pass through the capacitive objects. These interruptions in the electric fields cause a detectable change in the mutual capacitance that can be quantified as mutual sensing raw data and may be converted into mutual strengths 202 by subtracting them from a corresponding baseline strength.

Additionally, the self-sensing capacitive strengths may be arranged in rows of self-sense strengths 204 and/or columns of self-force strengths 206. The self-sensing scan may include the touchscreen controller 110 driving (with a voltage) and scanning each of the sense lines 120 and drive lines 122. In other embodiments, the self-sensing process may include driving and scanning either each of the sense lines 120 or each of the drive lines 122. During the self-sensing process, the self-capacitance 124 of each of sense lines 120 and drive lines 122 are measured to obtain self-sensing raw data. The self-sensing raw data sensed by the sense lines 120 may be defined as the self-sense raw data. The self-sensing raw data sensed by the drive lines 122 may be defined as self-force raw data.

When a capacitive object is brought proximate to a driven sense line 120 or drive line 122, it adds an additional capacitance that can be measured. This additional capacitance results in a charge transfer and therefore a flow of current that may be measured. The additional current sensed by the sense lines 120 may be quantified as self-sense raw data corresponding to each sense line 120. In the same manner described above, the self-sense raw data may be converted to self-sense strengths 204 by subtracting the self-sense raw data from a corresponding baseline strength.

Similarly, the additional current sensed by each drive line 122 may be quantified as self-force raw data and may be converted to self-force strengths 206 in the same manner discussed above. As understood by those with ordinary skill in the art, the self-sense strengths 204 may be arranged in a single row representing each sense line 120, and the self-force strengths 206 may be arranged in a single column representing each drive line 122.

The inventors of this application have identified that the self-capacitances 124 sensed in the folding area 106 changes based on the folding angle θ. As the first portion 102 is rotated, the sense lines 120 or the drive lines 122 (depending on the orientation of the rotation) in the folding area 106 experience a noticeable change in their self-capacitances 124. In other words, the sense lines 120 or drive lines 122 within the folding area 106 may sense the first portion 102 being rotated towards the second portion 104.

For example as illustrated in graph 208 FIG. 2B, when the electronic device 100 is in flip mode and the flexible touchscreen 101 is rotated in the direction of the sense lines 120, there is only a noticeable change in the self-sense strength values in the folding area 106, while there is little variation in the self-force strength values in the folding area 106 (e.g. the values in the center of the self-sense strengths 204).

Therefore, in various embodiments, the folding angle θ may be determined based on the self-sense strengths 204 or the self-force strengths 206 across the folding area 106 depending on the orientation of rotation. This will be discussed in more detail below.

Although the embodiments described below will be discussed in reference to an electronic device 100 configured for flip mode, this is for example purposes only. In other words, although the process steps will be described with respect to the self-sense strengths, the same process steps may be performed using the self-force strengths if the electronic device 100 is in fold mode.

Figure 3:
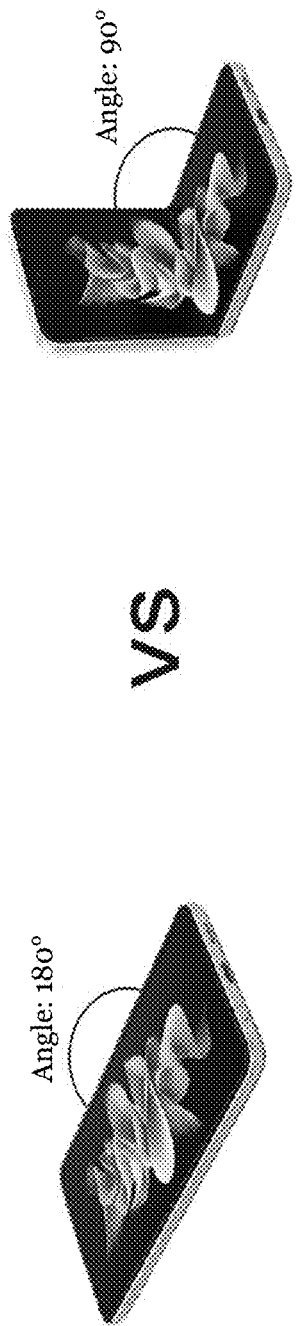
FIG. 3 illustrates a graphical representation of the self-sense raw data detected by the flexible touchscreen in the folding area for two different folding angles in accordance with an embodiment of the present application.
Figure 3:
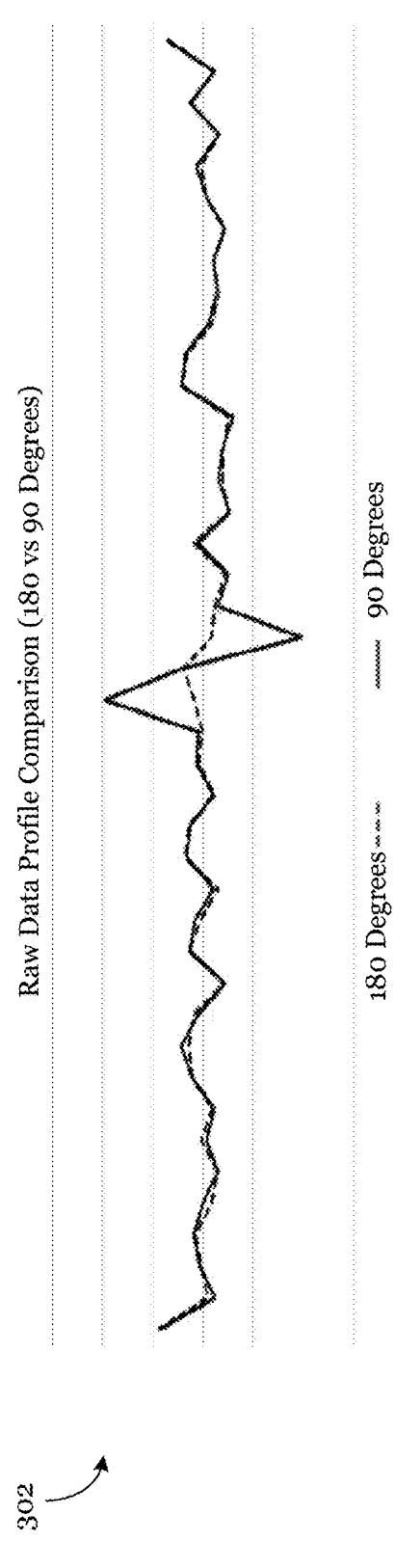
Figure 3:
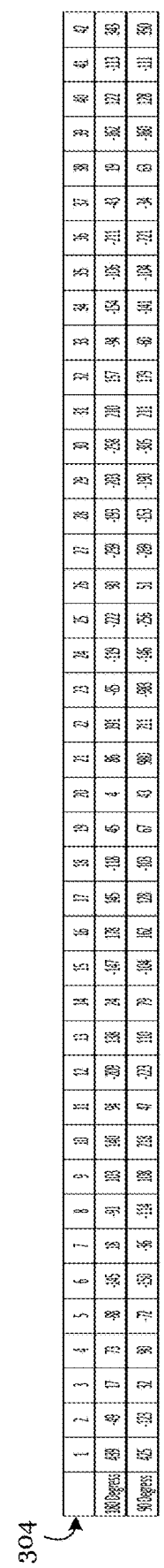

FIG. 3 illustrates a graphical representation of the self-sense raw data detected by the flexible touchscreen in the folding area for two different folding angles in accordance with an embodiment of the present application.

FIG. 3 illustrates the differences in the self-sense raw touch data sensed by the sense-lines during a self-sensing scan in flip mode when the folding angle θ of the flexible touchscreen 101 is fully open and equal to 180 degrees and when the flexible touchscreen 101 is rotated to 90 degrees. As illustrated by both the graph 302 and the table 304 when the first portion 102 is rotated from 180 to 90 degrees, there is only a noticeable change in the self-capacitances 124 sensed by the sense lines 120 in the folding area 106 (e.g. columns 21-23). In other words, the more the first portion 102 is rotated towards the second portion 104, the more the folding area 106 senses the first portion 102 (and vice versa).

Therefore, the self-capacitances 124 sensed in the folding area 106 may be correlated to and used to determine the folding angle θ.

The inventors of this application have identified that as the flexible touchscreen 101 is folded (i.e. closed) the self-capacitive strength profile of the folding area 106 changes linearly.

Figure 4A:
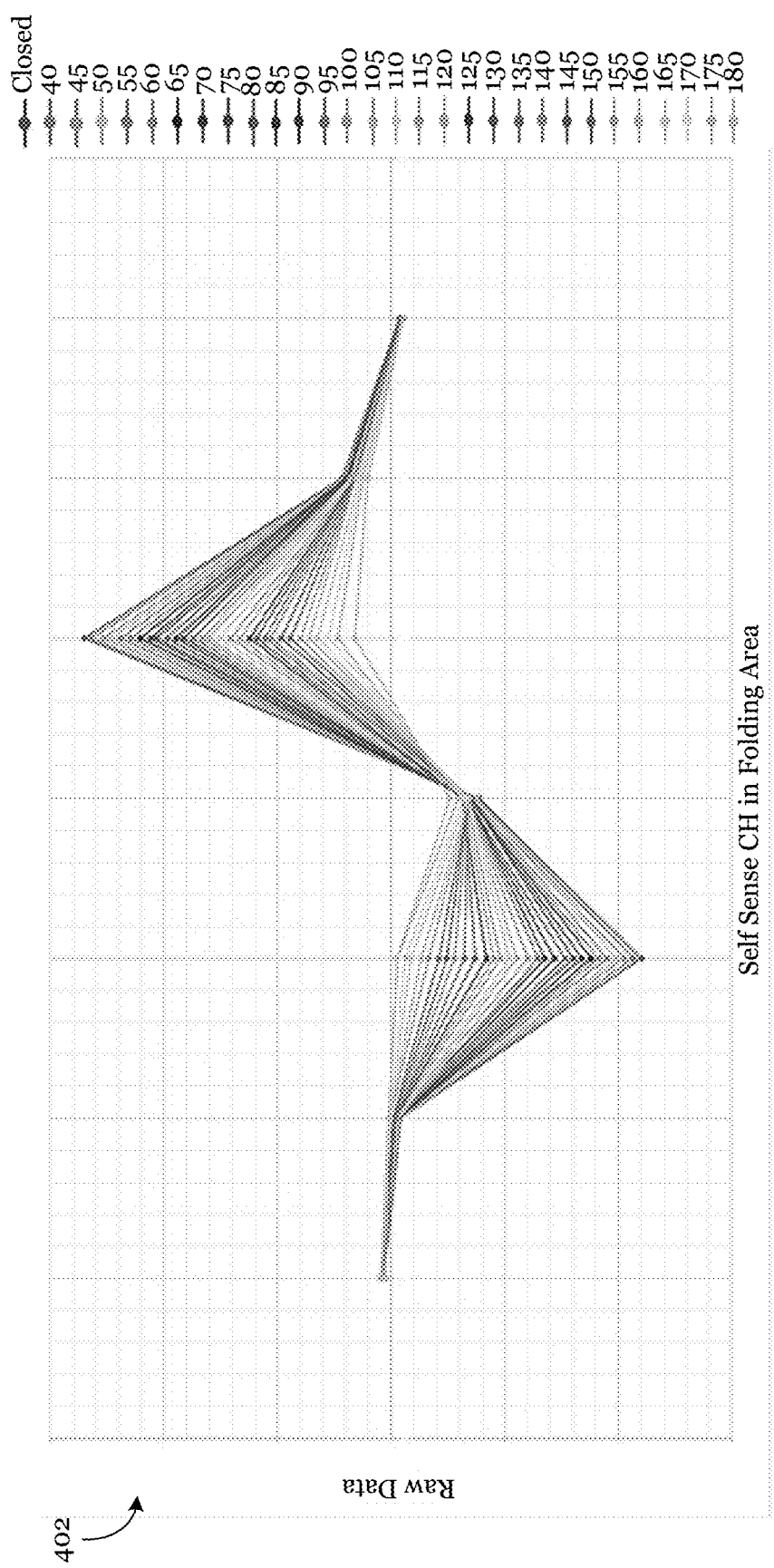
Figure 4B:
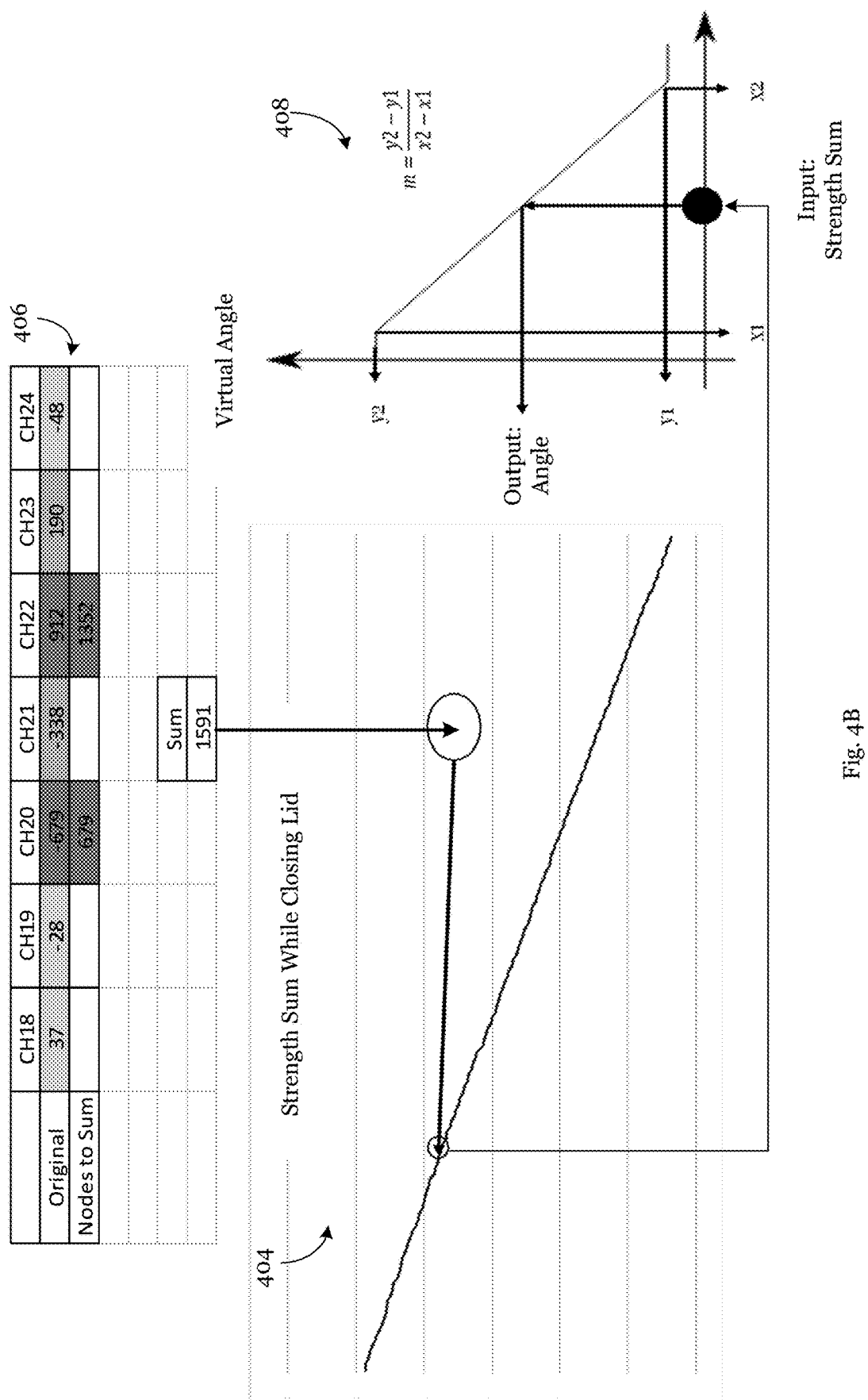
Figure 4C:
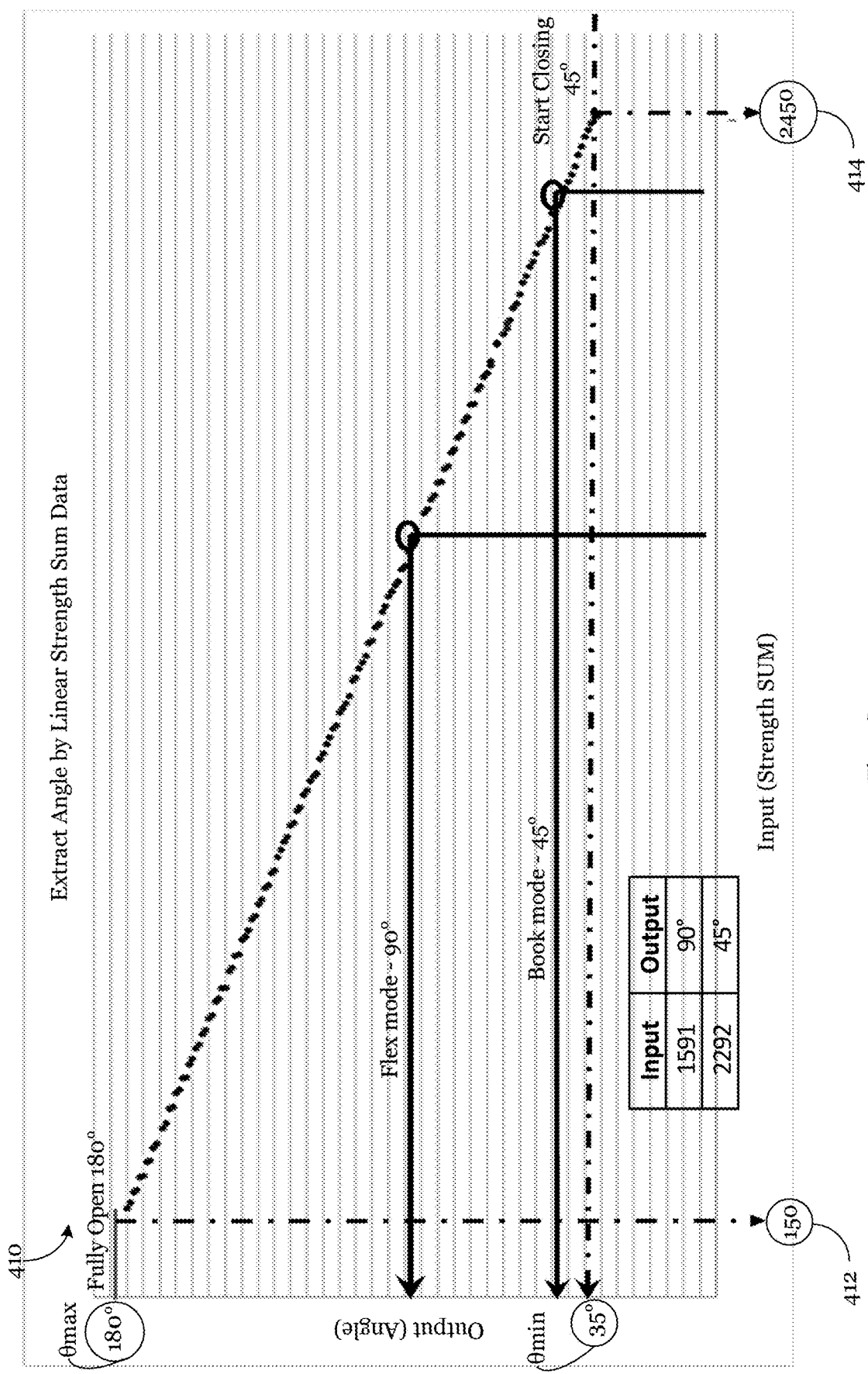

FIGS. 4A-4C illustrate graphical representations for determining the folding angle of the flexible touchscreen based on capacitive strengths sensed in the folding area of the touchscreen in accordance with an embodiment of the present application, wherein FIG. 4A illustrates a graphical representation of self-sense raw data detected in the foldable area mapped to respective folding angles, FIG. 4B illustrates a graphical representation of capacitive strengths sensed in the folding area mapped to respective folding angles, FIG. 4C illustrates a graphical representation of determining a folding angle of the flexible touchscreen from the capacitive detected in the folding area based on mappings of known capacitive strengths in the folding area.

Referring to FIG. 4A, graph 402 illustrates multiple sets of self-sense raw data sensed by each sense line 120 in the folding area 106 that are each mapped to a folding angle θ. As illustrated in graph 402 the self-sense raw data may reach peak values on the first side of the folding axis 107 and the second side of the folding axis 107 having opposite signs. For example the first side of the folding axis 107 may reach a minimum peak self-sense raw data value and the second side of the folding axis 107 may reach a maximum peak self-sense raw data value (or vice versa).

Also, as illustrated in graph 402, as the flexible touchscreen 101 is rotated from open to closed (i.e. the folding angle θ decreases), the absolute value of each of the peaks may increase by an equal value. In other words, the differences in the absolute values of each of the peak values between consecutive lines in graph 402 are equal while the absolute values of the peaks increase as the folding angle θ decreases.

Based on this relationship, the inventors have identified that the strength sensed by the folding area 106 may be quantified by adding the absolute values of both of the peaks. Also the inventors identified that the strength sensed by the folding area 106 and the folding angle θ have a linear relationship.

Referring to FIG. 4B, table 406 illustrates an example of quantifying the strength sensed by the folding area 106 by adding the absolute values of the maximum and minimum self-sensing strengths sensed in the folding area 106.

Then as illustrated by graph 404, after determining the strength sensed by the folding area 106 for each folding angle θ in graph 402 a linear relationship exists between the strength sensed by the folding area 106 and the folding angle θ. In other words, as the first portion 102 is rotated towards the second portion 104, the more the first portion 102 is sensed by the folding area 106.

Therefore, as illustrated by graph 408, a linear line can be plotted between two known strengths of the folding area that are mapped to two known folding angles. Then using the equation of the linear line, the folding angle θ may be determined by finding the position of a current strength sensed by the folding area 106 on the linear line. In other words, a current strength sensed by the folding area 106, such as the strength sensed by the folding area 106 in table 406, may be used as an input value, i.e., the strength that appears at the current lid angle, to an equation representing this linear relationship to determine a virtual folding angle. This will be described in more detail below.

FIG. 4C, illustrates an example of determining a folding angle (theta) based on the strength sensed by the flexible touchscreen 101 in the folding area 106.

Referring to graph 410 prior to determining the folding angle θ a first strength 412 may be mapped to a first folding angle and a second strength 414 may be mapped to a second folding angle. In various embodiments, the first folding angle may be the maximum folding angle $\theta_{max}$ and the second folding angle may be the minimum folding angle $\theta_{min}$. The maximum folding angle $\theta_{max}$ may be equal to 180 degrees indicating that the flexible touchscreen 101 is completely open. On the other hand the minimum folding angle $\theta_{min}$ may be the greatest possible folding angle in which the user can still view the front of the first portion 102, for example an angle between 0 and 45 degrees, for example 35 degrees. In other words, the minimum folding angle $\theta_{min}$ is the largest folding angle θ in which the flexible touchscreen 101 is still considered open. Alternatively the minimum folding angle may be 0 degrees. Similarly, in various embodiments, the first strength 412 may be a minimum strength sensed in the folding area 106 when the folding angle θ is equal to $\theta_{max}$, and the second strength 414 may be a maximum strength sensed in the folding area 106 when the folding angle θ is equal to $\theta_{min}$.

In various embodiments the first and second strengths their corresponding angles may be pre-programmed in the memory 113 or the user may be instructed to fold the flexible touchscreen 101 to specific angles to calibrate the flexible touchscreen 101 prior to use. For example the user may be asked to fully fold and unfold the flexible touchscreen and the strengths measured at each position may be stored and used to determine any possible folding angle of the flexible touchscreen 101.

Using the linear relationship between the strength and the folding angle θ, the folding angle θ of the flexible touchscreen 101 may be determined based on a current strength of the folding area 106 using the following equation:

$$\theta = 180 - \frac{(Strength - Strength_{min.}) * (\theta_{max.} - \theta_{min.})}{Strength_{max.} - Strength_{min.}} \quad \text{Eq. 1}$$

Where 180 degrees is an off-set angle. In other words, 180 degrees represents the y-intercept of the linear line because if the folding angle detects a strength less that the first strength 412 (e.g. the minimum strength), the folding angle θ is equal to the maximum folding angle, 180 degrees.

For example, referring to the table in FIG. 4C, if a current strength of the folding area is equal to 1591 the Eq. 1 may be used as follows:

$$180 - \frac{(1591 - 150) * (180 - 35)}{2250 - 150} \approx 90$$

Also for example, referring back to the table in FIG. 4C if a current strength of the folding area is equal to 2292 the Eq. 1 may be used as follows:

$$180 - \frac{(2292 - 150) * (180 - 35)}{2250 - 150} \approx 45$$

Figure 5:
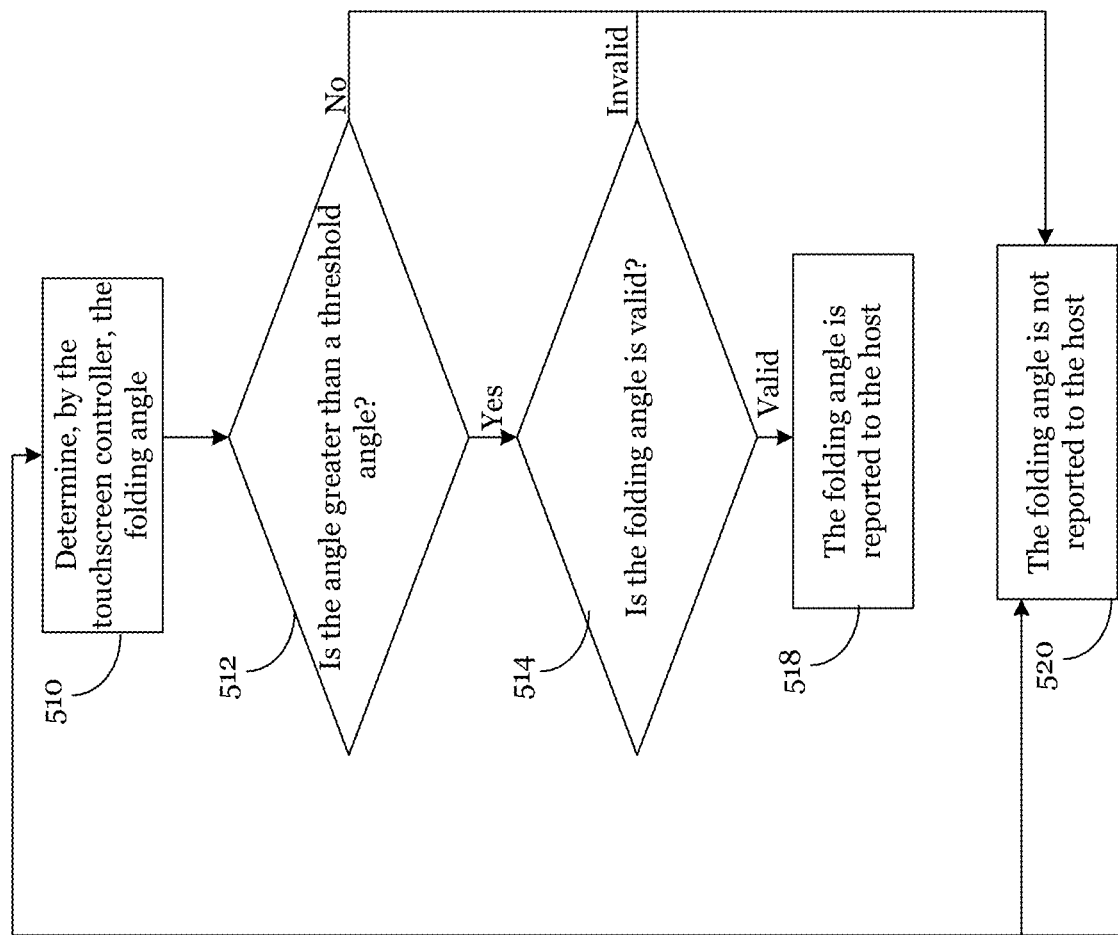
FIG. 5 illustrates a process flow of determining a folding angle of the flexible touchscreen based on the capacitive strength sensed in the folding area in accordance with an embodiment of the present application.
Figure 5:
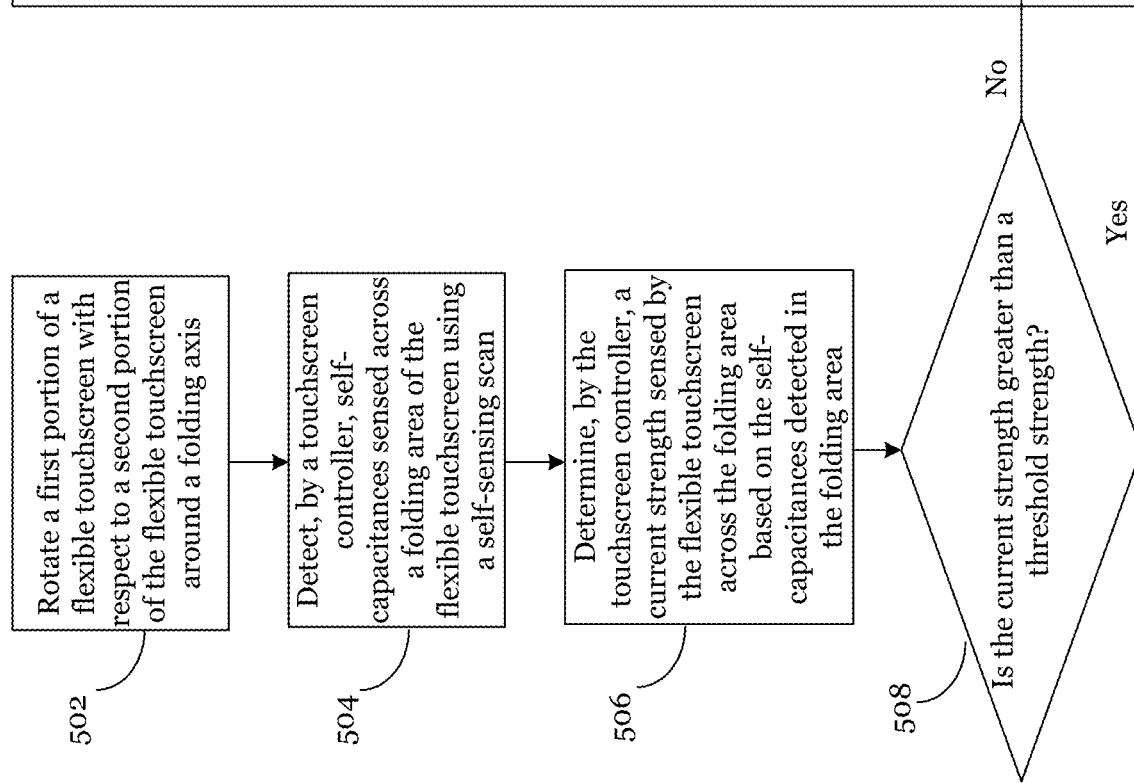

FIG. 5 illustrates a process flow of determining a folding angle of the flexible touchscreen based on the capacitive strength sensed in the folding area in accordance with an embodiment of the present application.

As illustrated in block 502 and described with reference to FIG. 1, the first portion 102 may be rotated towards the second portion 104. In other words the folding angle θ may be changed by rotating the first portion 102 towards the second portion 104.

As next illustrated in block 504 and described with reference to FIG. 1 the self-capacitances 124 across the folding area 106 may be detected using a self-sensing scan performed by the touchscreen controller no.

As next illustrated in block 506 and described with reference to FIGS. 1-4, a current strength sensed by the flexible touchscreen 101 in the folding area 106 may be determined by the touchscreen controller 110. As described above, the current strength sensed by the flexible touchscreen 101 may be determined by converting each of the self-sense raw data to the strength domain by subtracting each of the self-sense raw data from corresponding baseline strengths. Then the absolute values of the maximum and minimum self-sense strengths may be added to determine the current strength. Details on how to determine the baseline strength will be discussed below.

As next illustrated in block 508 and described with reference to FIGS. 1-4, the current strength may be compared to a threshold strength. The threshold strength may be the strength in the folding area mapped to the maximum folding angle θ. (e.g. first strength 412). As explained above, prior to determining the current strength, a first strength 412 may be mapped to the maximum folding angle $\theta_{max}$ and a second strength 414 may be mapped to the minimum folding angle $\theta_{min}$. As would be appreciated by those with ordinary skill in the art if the current strength is less than the first strength 412, the folding angle θ is equal to the maximum folding angle $\theta_{max}$. Therefore, the method can proceed to block 520 and the folding angle θ is not reported to the host and the previous determined folding angle is used.

On the other hand, if the current strength is greater than the threshold strength (e.g. the first strength 412), the process continues to block 510 and the folding angle θ may be determined.

As next illustrated in block 510 and described with reference to FIGS. 1-4, the folding angle θ may be determined based on the current strength of the folding area 106. As described above the folding angle θ may be determined by inputting the current strength into Eq. 1

As next illustrated in block 512 whether the folding angle θ is over a threshold angle may be determined. The threshold angle may correspond the smallest possible folding angle in which the flexible touchscreen is considered open (e.g. $\theta_{min}$). If the folding angle θ is less than the threshold angle the method proceeds to block 520 and the determined folding angle is not reported to the host 114.

On the other hand if the folding angle θ is greater than the threshold angle, the method process to block 514 and the folding angle is validated.

As next illustrated in block 514 and described with reference to FIGS. 1-4, the folding angle θ may be validated. In various embodiments, the folding angle θ may be validated by mutual strength profiling and/or self-strength profiling. If the folding angle θ is validated the method proceeds to block 518 and the folding angle θ is reported to the host 114. On the other hand, if the folding angle θ is not validated the method proceeds to block 520 and the folding angle θ is not reported to the host 114, and the previous determined folding angle is used.

During mutual strength profiling the touchscreen controller 110 verifies that the current strength was determined from self-sensing and not mutual sensing, validating that the current strength corresponds to a folding angle θ and not actual touch. In embodiments where only mutual strength profiling is used, if the folding angle θ is validated the method proceeds to block 518 and the folding angle θ is reported to the host 114.

On the other hand if the folding angle θ is not validated by mutual strength profiling, the folding angle θ is not reported (block 520) and the folding angle θ from the previous frame is reused.

Similarly, in other embodiments, the folding angle θ may be verified using self-strength profiling. Self-strength profiling involves determining that the folding angle θ was determined using self-sense strengths instead of self force strengths (or vice versa). If the folding angle θ is validated then the method proceeds to block 518. On the other hand if the folding angle θ is not validated the method proceeds to block 520. Details on self-strength profiling will be described in more detail in FIG. 6 below.

Mutual strength profiling and self-strength profiling may be used to validate the folding angle in the alternative or in combination. In other words the folding angle θ may be validated by mutual strength profiling and self-strength profiling or may be validated by passing both types of profiling.

Figure 6:
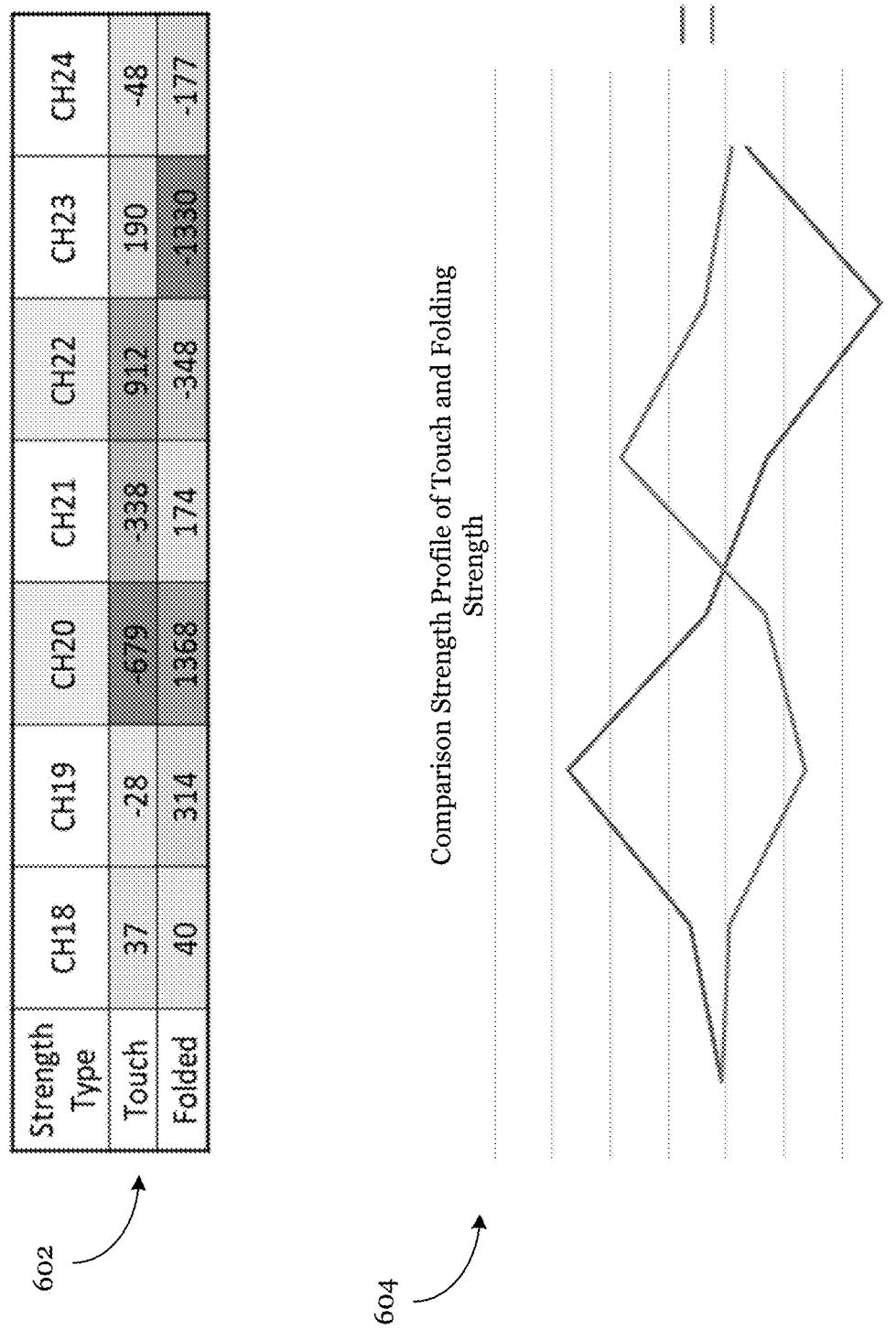
FIG. 6 illustrates a graphical representation of validating a folding angle based on self-strength profiling in accordance with an embodiment of the present application.

FIG. 6 illustrates a graphical representation of validating a folding angle based on self-strength profiling in accordance with an embodiment of the present application.

As illustrated in table 602 and graph 604, self-strength profiling involves the touchscreen controller no evaluating the self-sense strengths. As illustrated in in table 602 and graph 604, whether the self-sense strengths correspond to a touch or the folding angle θ depends on the signs of the strengths on each side of the folding axis 107. For example, positive self-strength values on the first side of the folding axis 107 may correspond to a touch and negative self-strength values may correspond to a fold (and vice versa). Therefore, based on the signs of the self-strengths, the touchscreen controller no may validate the folding angle θ.

As described above, in order to switch from the raw data domain to the strength domain, as understood by those with ordinary skill in the art, the touchscreen controller no may convert the raw data values to strengths by subtracting a raw data from a corresponding baseline value.

Figure 7:
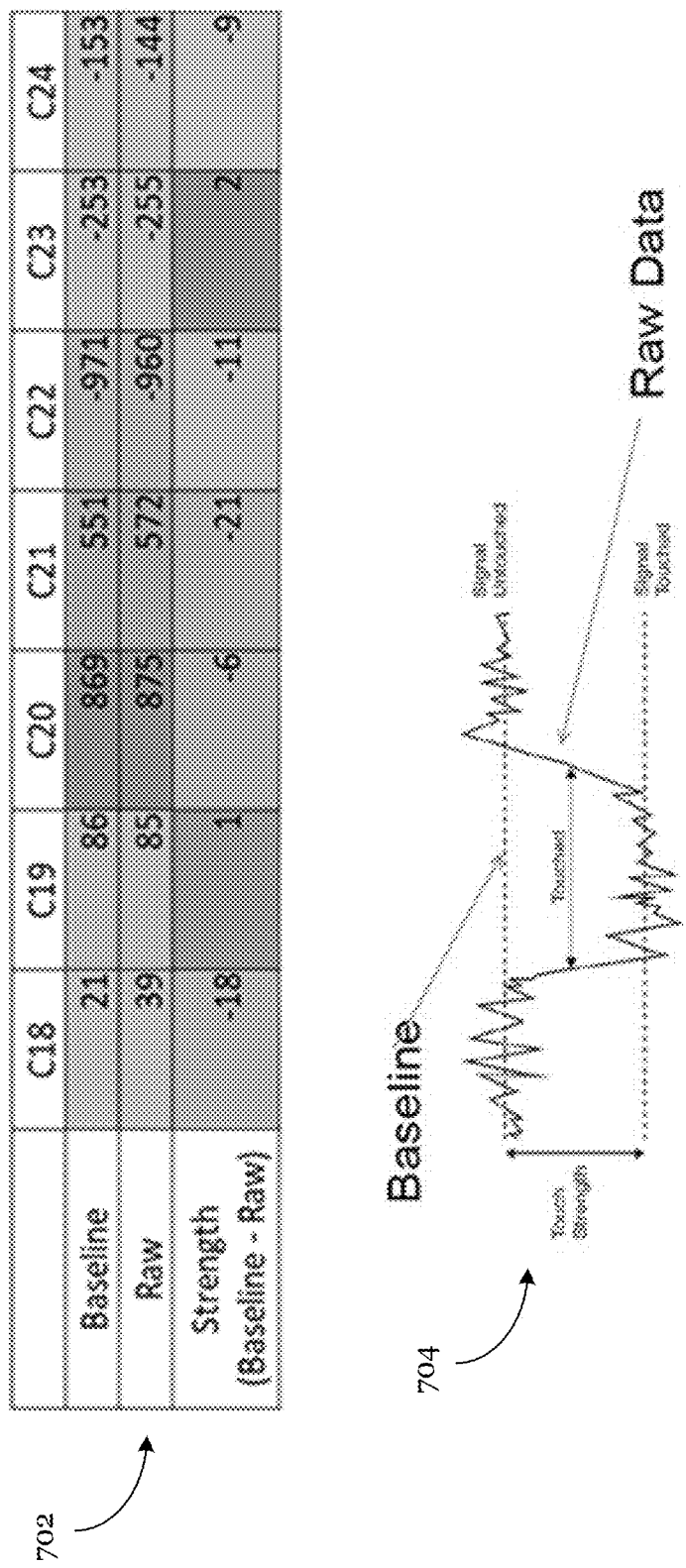
FIG. 7 illustrates a graphical representation of determining baseline strengths of the flexible touchscreen in accordance with an embodiment of the present application.

FIG. 7 illustrates a graphical representation of determining baseline strengths of the flexible touchscreen in accordance with an embodiment of the present application.

Referring to FIG. 7, table 702 illustrates an example of converting the self-sense raw data within the folding area 106 to self-sense strengths. As illustrated in table 702 the self-sense raw data sensed in the folding area 106 may each be subtracted from a corresponding baseline strength of each sense line 120 in the folding area 106, resulting in self-sense strengths.

As understood by those with ordinary skill in the art, baseline data tracking algorithms are commonly used to determine the baseline strengths. In other words, the baseline strength tracks changes in the raw data. However, the inventors of this application identified that the baseline strength may become distorted because the baseline tracking algorithms take environmental changes into account and may mistake small changes in capacitances as environmental changes.

Conventional baseline tracking algorithms use baseline strengths that are raw data values generated by tracking the raw data collected based on each capacitance (for mutual and self sensing). In other words, conventional baseline strengths follow the trend of the collected raw data. For example, the baseline strengths may be determined by filtering the collected raw using a moving average filter, an infinite impulse filter, or the like.

When using the conventional baseline strengths, the capacitive strengths may be determined from subtracting raw data collected from its corresponding baseline strengths, and touches may only be reported where the capacitive strengths exceed a threshold. For example, as illustrated by graph 704, if an environmental change such as an increase in temperature, or water droplets on the screen occurs, only small change in strength is recognized and touch will not be reported.

Therefore, the inventors of this application have identified that small changes in the folding angle θ, may only have a small effect on the self-sense strengths sensed in the folding area 106, and may be dismissed as an environmental change. Advantageously, in various embodiments, pure raw data may be determined and used as baseline strengths to determine an accurate folding angle θ.

Figure 8A:
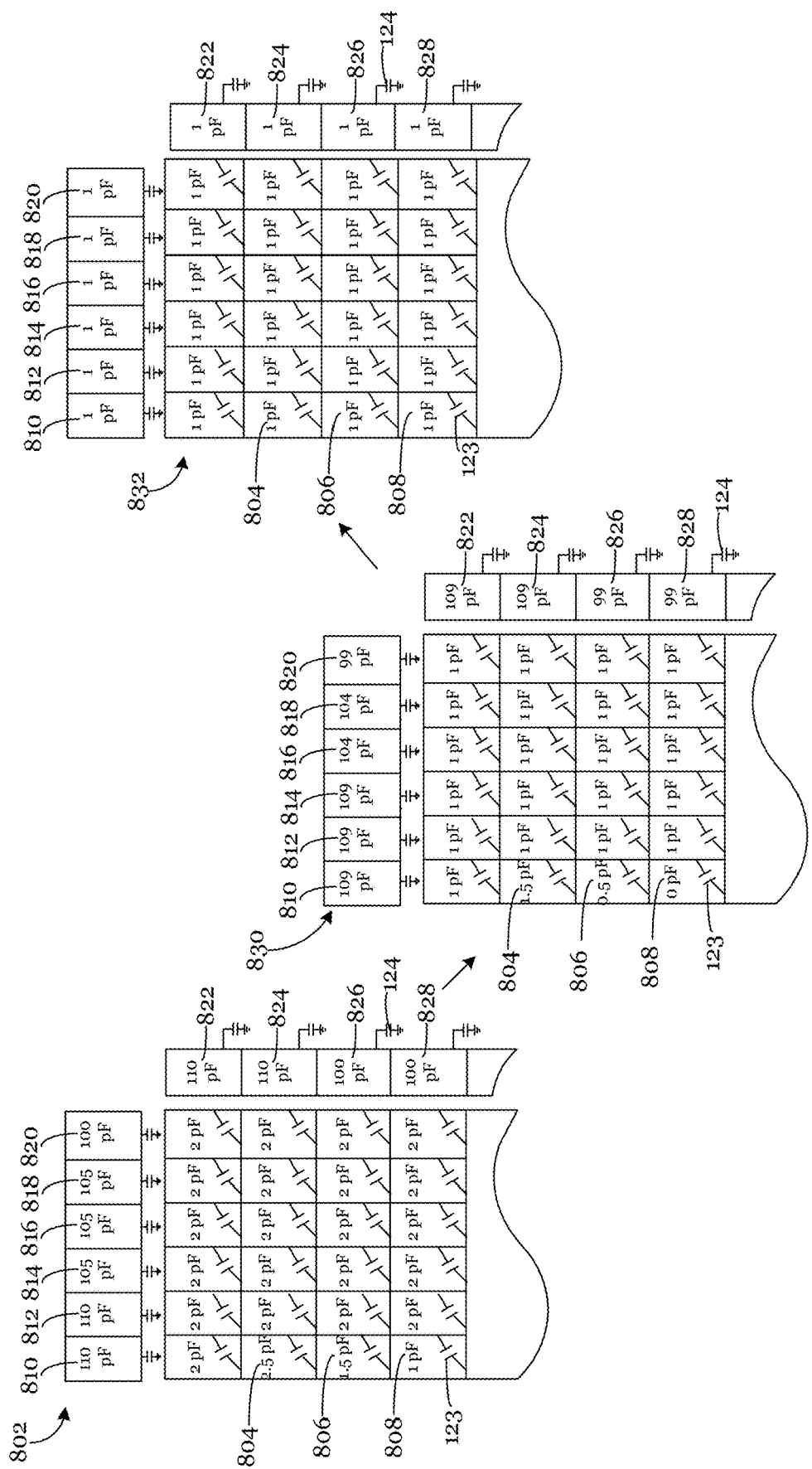
Figure 8B:
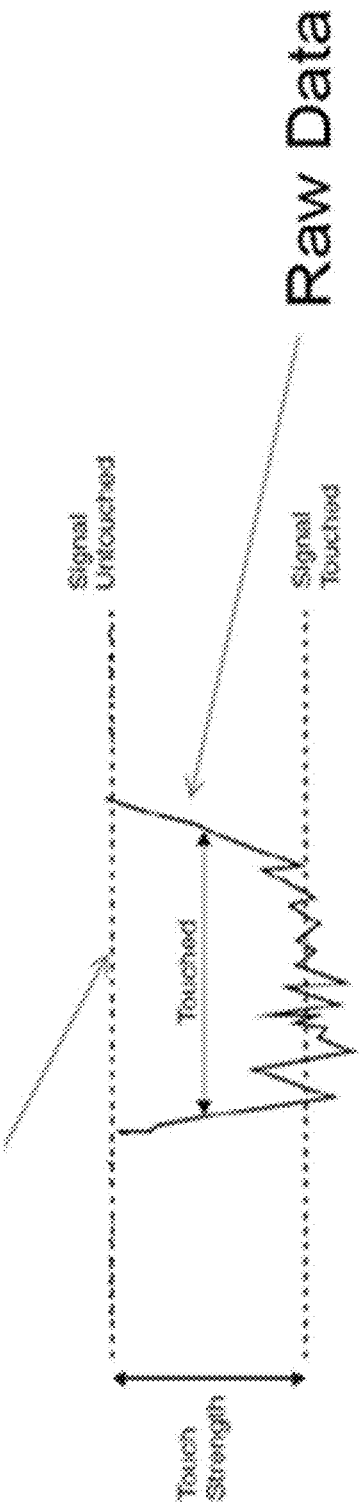
Figure 9:
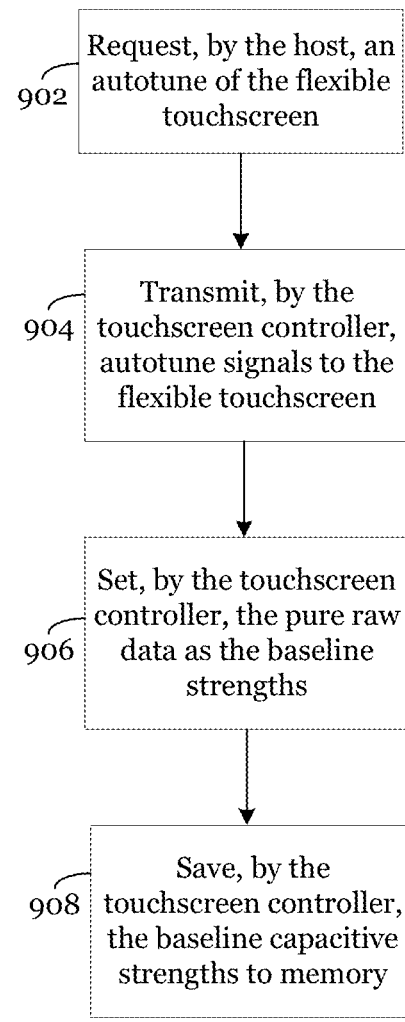
FIG. 9 illustrates a process flow of determining and storing pure raw data as baseline data in accordance with an embodiment of the present application.

FIGS. 8A-8B illustrate schematic views of the process steps for determining the capacitive strengths sensed by the flexible touchscreen based on baseline strengths of the flexible touchscreen based on pure raw data in accordance with an embodiment of the present application, wherein FIG. 8A illustrates schematic views of the process steps for autotuning the flexible touchscreen to determine pure raw data, and FIG. 8B illustrates a graphical representation for determining capacitive strengths sensed in the folding area based on the pure raw data; and FIG. 9 illustrates a process flow of determining and storing pure raw data as baseline data in accordance with an embodiment of the present application.

Referring to FIG. 8A, prior to scanning the flexible touchscreen 101 using the mutual and self-sensing scans, pure raw self-sensing data, and pure raw mutual sensing data may be determined for each of the self and mutual capacitances.

Upon receiving the request from the host 114 to set a baseline strength (block 902) the touchscreen controller no may scan the flexible touchscreen 101 and determine each of the mutual capacitances 123 and self-capacitances 124 as illustrated by original touchscreen panel 802. For example, in the original touchscreen panel 802, each of the mutual capacitances 123 may equal 2 pF except for a first mutual capacitance 804 which is equal to 2.5 pF and a second mutual capacitance 806 equal to 1.5 pF and a third mutual capacitance 808 equal to 1 pF. The self-capacitances 123 of the self-sense lines 120 may include a first self-sense capacitance 810 and a second self-sense capacitance 812 equal to no pF, a third self-sense capacitance 814, a fourth self-sense capacitance 816, and a fifth self-sense capacitance 818 equal to 105 pF, and a sixth self-sense capacitance 820 equal to 100 pF. The self-capacitances of the drive lines 122 may include a first self-force capacitance 822 and a second self-force capacitance 824 equal to no pF, and a third self-force capacitance 826 and a fourth self-force capacitance 828 equal to 100 pF.

Based on the mutual capacitances 123 and self-capacitances 124 of the original touchscreen panel 802, the touchscreen controller no may generate a compensation map 830 illustrating the desired changes in capacitances to equalize each of the mutual capacitances 123 and self-capacitances. For example, the compensation map 830 illustrates the change in capacitances required for all the mutual capacitances 123 and self-capacitances 124 to be equal to 1 pF.

Then based on the compensation map 830, the touchscreen controller no may then transmit the required compensation signals, defined as an autotune signal, to the flexible touchscreen 101 in order to equalize the mutual capacitances 123 and self-capacitances 124 (block 904). In other words, the touchscreen controller no may determine a compensation map 830 and transmit an autotune signal to equalize all the mutual capacitances 123 and self-capacitances 124 resulting in autotuned panel 832.

[moo] Then, after autotuning the flexible touchscreen 101, the raw data corresponding to the mutual capacitances 123 (e.g. the mutual pure raw data) and the raw data corresponding to the self-capacitances 124 (e.g. the raw self-sense and self-force data) may set as the baseline strengths (block 906) and be saved in memory (block 908). Advantageously, pure raw data is not changed in memory unless the host 114 requests for it to be updated.

This process may be performed as needed to determine the folding angle θ.

Referring to FIG. 8B, table 834 and graph 836 illustrate how raw data sensed by the flexible touchscreen 101 may be converted to capacitive strengths by subtracting the raw data from the pure raw data. For example the self-sense strengths across the folding area 106 may be determined by subtracting self-sensing raw data from the pure raw data.

Advantageously, and as described above, using pure raw results in a more accurate self-sensing strength.

Figure 10:
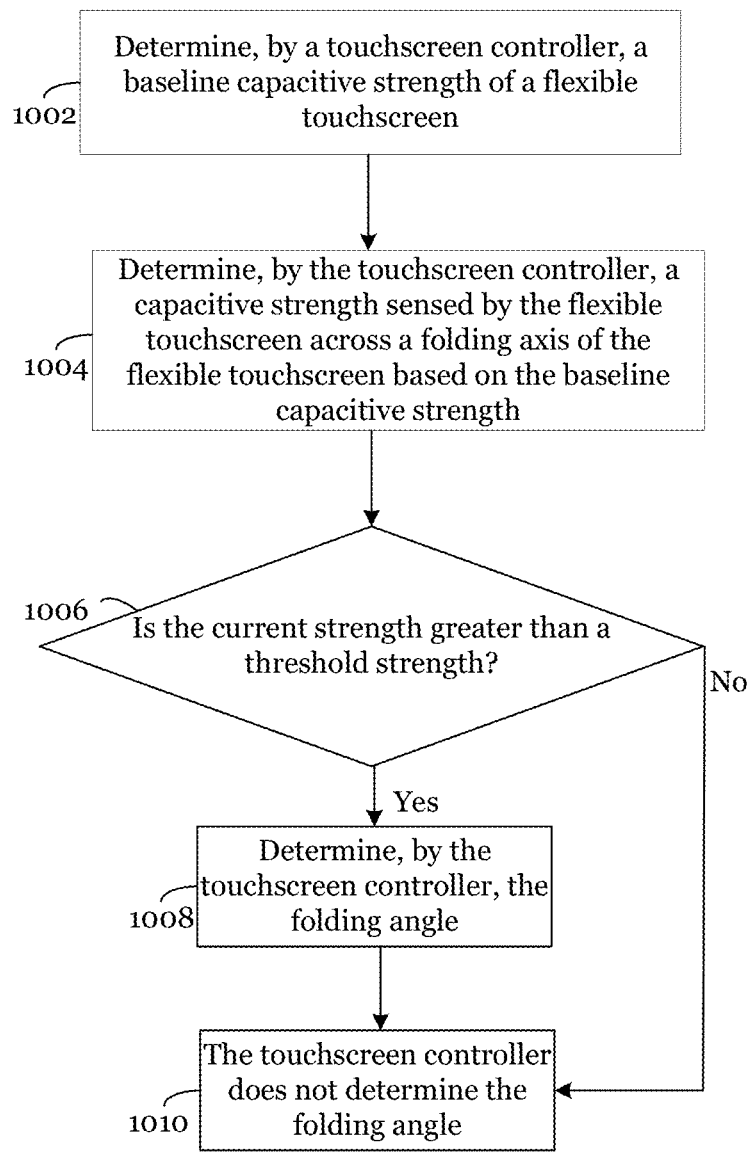
FIG. 10 illustrates a process flow of determining the folding angle of the flexible touchscreen according to an embodiment of the present application.

FIG. 10 illustrates a process flow of determining the folding angle of the flexible touchscreen according to an embodiment of the present application.

As illustrated in block 1002 and described with reference to FIGS. 6-9, the touchscreen controller no may determine a baseline capacitive strength of the flexible touchscreen 101. The baseline capacitive strength may be determined based on pure raw data in the same manner described above.

As illustrated in block 1004 and described with reference to FIGS. 1-9 a capacitive strength sensed by the flexible touchscreen 101 in the folding area 106 may be determined by the touchscreen controller no. As described above, the capacitive strength sensed by the flexible touchscreen 101 may be determined by converting each of the self-sense raw data to the strength domain by subtracting each of the self-sense raw data from corresponding baseline strengths.

As next illustrated in block 1006 and described with reference to FIGS. 1-9, the touchscreen controller no may determine whether the capacitive strength is greater than a threshold strength. The touchscreen controller no may determine whether the capacitive strength is greater than a threshold strength in the same manner described in FIG. 5.

If the capacitive strength is greater than the threshold strength the method may continue to block 1008 and the touchscreen controller no may determine the folding angle θ of the flexible touchscreen 101 using the steps described above.

On the other hand, if the touchscreen controller no determines that the capacitive strength is not greater than the capacitive strength, the method may continue to block 1010 and the touchscreen controller no may not determine the folding angle θ.

Example embodiments of the invention are summarized here. Other embodiments can also be understood from the entirety of the specification as well as the claims filed herein.

Example 1. A method for operating an electronic device, the method including: rotating a first portion of a flexible touchscreen with respect to a second portion of the flexible touchscreen around a folding axis; detecting, by a touchscreen controller, self-capacitances sensed in a folding area of the flexible touchscreen using a self-sensing scan, where a first side of the folding area is on the first portion of the flexible touchscreen and a second side of the folding area is on the second portion of the flexible touchscreen, and the first side and the second side are separated by a folding axis; determining, by the touchscreen controller, a current strength sensed by the flexible touchscreen in the folding area based on the self-capacitances in the folding area; and determining, by the touchscreen controller, a folding angle of the first portion of the flexible touchscreen with the second portion of the flexible touchscreen around the folding axis based on the current strength in the folding area.

Example 2. The method of example 1, further including: determining, by the touchscreen controller, a baseline strength of the flexible touchscreen; determining, by the touchscreen controller, differences between the baseline strength and the self-capacitances sensed in the folding area; and determining, by the touchscreen controller, the current strength of the flexible touchscreen by adding the absolute value of the two greatest differences between the baseline strength and the self-capacitances in the folding area.

Example 3. The method of one of examples 1 or 2, where determining the baseline strength of the flexible touchscreen further includes performing, by the touchscreen controller, an auto tune of the flexible touchscreen.

Example 4. The method of one of examples 1 to 3, where determining a folding angle of the first portion of the flexible touchscreen with the second portion of the flexible touchscreen around the folding axis includes: mapping a first folding angle to a first strength sensed across the folding area; mapping a second folding angle to a second strength sensed across the folding area, the first folding angle and the second folding angle corresponding to predetermined rotational positions of the flexible touchscreen around the folding area; determining a slope between the mappings; and determining the folding angle based on the slope and the current strength.

Example 5. The method of one of examples 1 to 4, where the first folding angle corresponds to the maximum folding angle of the flexible touchscreen and the second folding angle corresponds to the greatest folding angle allowable while the flexible touchscreen is considered in an open position.

Example 6. The method of one of examples 1 to 5, further including: determining whether the folding angle of the first portion of the flexible touchscreen is greater than a minimum folding angle or is less than a maximum folding angle; in response to determining that the folding angle of the first portion of the flexible touchscreen is greater than the minimum folding angle, reporting the folding angle to a host of the electronic device; and in response to determining that the folding angle of the first portion of the flexible touchscreen is less than the maximum folding angle, reporting the folding angle to the host of the electronic device.

Example 7. The method of one of examples 1 to 6, further including determining the current strength sensed by the flexible touchscreen is greater than a minimum threshold strength indicative of a maximum folding angle of the flexible touchscreen.

Example 8. A method for operating an electronic device, the method including: determining, by a touchscreen controller, a baseline capacitive strength of a flexible touchscreen, the baseline capacitive strength being indicative of equal capacitances sensed by the flexible touchscreen prior to the touchscreen controller performing sensing scans to detect touch by the flexible touchscreen; determining, by the touchscreen controller, a capacitive strength sensed by the flexible touchscreen across a folding axis of the flexible touchscreen based on the baseline capacitive strength, the capacitive strength being indicative of self-capacitances sensed by the flexible touchscreen across the folding axis during a self-sensing scan; determining whether the capacitive strength is greater than a threshold capacitive strength indicative of a maximum allowable folding angle of the flexible touchscreen; and in response to determining the capacitive strength is greater than the threshold capacitive strength, determining, by the touchscreen controller, the folding angle of the flexible touchscreen based on the capacitive strength.

Example 9. The method of example 8, further including: validating, by the touchscreen controller, whether the capacitive strength sensed by the flexible touchscreen across the folding axis is indicative of a folding angle of the flexible touchscreen; and in response to validating that the capacitive strength is indicative of the folding angle of the flexible touchscreen, reporting the folding angle to a host of the electronic device.

Example 10. The method of one of examples 8 or 9, where determining the capacitive strength includes: performing, by the touchscreen controller, the self-sensing scan on the flexible touchscreen; determining, by the touchscreen controller, self-capacitances sensed by a touchscreen array across the folding axis based on the self-sensing scan; determining, by the touchscreen controller, differences between the baseline capacitive strength and the self-capacitances sensed across the folding axis; and determining, by the touchscreen controller, the capacitive strength across the folding axis by adding the absolute value of the two greatest differences between the baseline capacitive strength and the self-capacitances across the folding axis.

Example 11. The method of one of examples 8 to 10, where determining the baseline capacitive strength further includes: determining, by the touchscreen controller, mutual and self-capacitances sensed across an entirety of the flexible touchscreen; and transmitting, by the touchscreen controller, an autotune signal across the entirety of the touchscreen configured to cause each of the mutual and self-capacitances across the flexible touchscreen to be equal.

Example 12. The method of one of examples 8 to 11, further including determining that the folding angle of the flexible touchscreen is greater than a predetermined angle threshold; and in response to determining that the folding angle of the flexible touchscreen is over the predetermined angle threshold, reporting the folding angle to a host of the electronic device.

Example 13. The method of one of examples 8 to 12, where the folding angle of the flexible touchscreen indicates a first portion of the flexible touchscreen being positioned at the folding angle away from a second portion of the flexible touchscreen along the folding axis.

Example 14. The method of one of examples 8 to 13, where determining the folding angle of the flexible touchscreen includes: mapping a first folding angle to a first folding strength; mapping a second folding angle to a second folding strength; determining a slope between the mappings; and determining the folding angle based on the slope and the capacitive strength.

Example 15. A device including: a flexible touchscreen including a first portion and a second portion, the first portion configured to be rotated with respect to the second portion around a folding axis positioned within a folding area, where a first side of the folding area is on the first portion of the flexible touchscreen and a second side of the folding area is on the second portion of the flexible touchscreen, and the first side and the second side are separated by the folding axis; a controller; and a memory for storing a program to be executed in the controller, the program including instructions when executed cause the controller to: detect self-capacitances sensed in the folding area using a self-sensing scan; determine a current strength sensed by the flexible touchscreen in the folding area based on the self-capacitances in the folding area; and determine a folding angle of the first portion of the flexible touchscreen with the second portion of the flexible touchscreen around the folding axis based on the current strength in the folding area.

Example 16. The device of example 15, where the program further includes instructions to: determine a baseline strength of the flexible touchscreen; determine differences between the baseline strength and the self-capacitances sensed in the folding area; and determine the current strength of the flexible touchscreen by adding the absolute value of the two greatest differences between the baseline strength and the self-capacitances in the folding area.

Example 17. The device of one of examples 15 or 16, where the program further includes instructions to perform an auto tune of the flexible touchscreen to determine the baseline strength of the flexible touchscreen.

Example 18. The device of one of examples 15 to 17, where the program further includes instructions to: map a first folding angle to a first strength sensed across the folding area; map a second folding angle to a second strength sensed across the folding area, the first fold angle and the second folding angle corresponding to predetermined rotational positions of the flexible touchscreen around the folding area; determine a slope between the mappings; and determine the folding angle based on the slope and the current strength.

Example 19. The device of one of examples 15 to 18, where the program further includes instructions to: determine that folding angle of the first portion of the flexible touchscreen is greater than a minimum folding angle; and in response to determining that the folding angle of the first portion of the flexible touchscreen is greater than the minimum folding angle, reporting the folding angle to a host of the device; or determine that the folding angle of the first portion of the flexible touchscreen is less than a maximum folding angle; and in response to determining that the folding angle of the first portion of the flexible touchscreen is less than the maximum folding angle, reporting the folding angle to a host of the device.

Example 20. The device of one of examples 15 to 19, where the program further includes instructions to determine the current strength sensed by the flexible touchscreen in the folding area is generated by folding or unfolding the flexible touchscreen based on mutual strength profiling or self-strength profiling.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
   rotating a first portion of a flexible touchscreen with respect to a second portion of the flexible touchscreen around a folding axis;
   detecting, by a touchscreen controller, self-capacitances sensed in a folding area of the flexible touchscreen using a self-sensing scan, wherein a first side of the folding area is on the first portion of the flexible touchscreen and a second side of the folding area is on the second portion of the flexible touchscreen, and the first side and the second side are separated by a folding axis;
   determining, by the touchscreen controller, a current strength sensed by the flexible touchscreen in the folding area based on the self-capacitances in the folding area;
   determining the current strength sensed by the flexible touchscreen is greater than a minimum threshold strength indicative of a maximum folding angle of the flexible touchscreen; and
   determining, by the touchscreen controller, a folding angle of the first portion of the flexible touchscreen with the second portion of the flexible touchscreen around the folding axis based on the current strength in the folding area.

2. The method of claim 1, further comprising:
   determining, by the touchscreen controller, a baseline strength of the flexible touchscreen;
   determining, by the touchscreen controller, differences between the baseline strength and the self-capacitances sensed in the folding area; and
   determining, by the touchscreen controller, the current strength of the flexible touchscreen by adding the absolute value of the two greatest differences between the baseline strength and the self-capacitances in the folding area.

3. The method of claim 2, wherein determining the baseline strength of the flexible touchscreen further comprises performing, by the touchscreen controller, an auto tune of the flexible touchscreen.

4. The method of claim 1, wherein determining a folding angle of the first portion of the flexible touchscreen with the second portion of the flexible touchscreen around the folding axis comprises:
   mapping a first folding angle to a first strength sensed across the folding area;
   mapping a second folding angle to a second strength sensed across the folding area, the first folding angle and the second folding angle corresponding to predetermined rotational positions of the flexible touchscreen around the folding area;
   determining a slope between the mappings; and
   determining the folding angle based on the slope and the current strength.

5. The method of claim 4, wherein the first folding angle corresponds to the maximum folding angle of the flexible touchscreen and the second folding angle corresponds to the greatest folding angle allowable while the flexible touchscreen is considered in an open position.

6. The method of claim 1, further comprising:
   determining whether the folding angle of the first portion of the flexible touchscreen is greater than a minimum folding angle or is less than a maximum folding angle;
   in response to determining that the folding angle of the first portion of the flexible touchscreen is greater than the minimum folding angle, reporting the folding angle to a host of the electronic device; and
   in response to determining that the folding angle of the first portion of the flexible touchscreen is less than the maximum folding angle, reporting the folding angle to the host of the electronic device.

7. A method for operating an electronic device, the method comprising:
   determining, by a touchscreen controller, a baseline capacitive strength of a flexible touchscreen, the baseline capacitive strength being indicative of equal capacitances sensed by the flexible touchscreen prior to the touchscreen controller performing sensing scans to detect touch by the flexible touchscreen;
   determining, by the touchscreen controller, a capacitive strength sensed by the flexible touchscreen across a folding axis of the flexible touchscreen based on the baseline capacitive strength, the capacitive strength being indicative of self-capacitances sensed by the flexible touchscreen across the folding axis during a self-sensing scan;
   determining whether the capacitive strength is greater than a threshold capacitive strength indicative of a maximum allowable folding angle of the flexible touchscreen; and
   in response to determining the capacitive strength is greater than the threshold capacitive strength, determining, by the touchscreen controller, the folding angle of the flexible touchscreen based on the capacitive strength.

8. The method of claim 7, further comprising:
   validating, by the touchscreen controller, whether the capacitive strength sensed by the flexible touchscreen across the folding axis is indicative of a folding angle of the flexible touchscreen;
   and in response to validating that the capacitive strength is indicative of the folding angle of the flexible touchscreen, reporting the folding angle to a host of the electronic device.

9. The method of claim 7, wherein determining the capacitive strength comprises:
   performing, by the touchscreen controller, the self-sensing scan on the flexible touchscreen;
   determining, by the touchscreen controller, self-capacitances sensed by a touchscreen array across the folding axis based on the self-sensing scan;
   determining, by the touchscreen controller, differences between the baseline capacitive strength and the self-capacitances sensed across the folding axis; and
   determining, by the touchscreen controller, the capacitive strength across the folding axis by adding the absolute value of the two greatest differences between the baseline capacitive strength and the self-capacitances across the folding axis.

10. The method of claim 7, wherein determining the baseline capacitive strength further comprises:
   determining, by the touchscreen controller, mutual and self-capacitances sensed across an entirety of the flexible touchscreen; and
   transmitting, by the touchscreen controller, an autotune signal across the entirety of the touchscreen configured to cause each of the mutual and self-capacitances across the flexible touchscreen to be equal.

11. The method of claim 7, further comprising determining that the folding angle of the flexible touchscreen is greater than a predetermined angle threshold; and
   in response to determining that the folding angle of the flexible touchscreen is over the predetermined angle threshold, reporting the folding angle to a host of the electronic device.

12. The method of claim 7, wherein the folding angle of the flexible touchscreen indicates a first portion of the flexible touchscreen being positioned at the folding angle away from a second portion of the flexible touchscreen along the folding axis.

13. The method of claim 7, wherein determining the folding angle of the flexible touchscreen comprises:
   mapping a first folding angle to a first folding strength;
   mapping a second folding angle to a second folding strength;
   determining a slope between the mappings; and
   determining the folding angle based on the slope and the capacitive strength.

14. A device comprising:
   a flexible touchscreen comprising a first portion and a second portion, the first portion configured to be rotated with respect to the second portion around a folding axis positioned within a folding area, wherein a first side of the folding area is on the first portion of the flexible touchscreen and a second side of the folding area is on the second portion of the flexible touchscreen, and the first side and the second side are separated by the folding axis;
   a controller; and
   a memory for storing a program to be executed in the controller, the program comprising instructions when executed cause the controller to:
      detect self-capacitances sensed in the folding area using a self-sensing scan;
      determine a current strength sensed by the flexible touchscreen in the folding area based on the self-capacitances in the folding area;
      determine the current strength sensed by the flexible touchscreen is greater than a minimum threshold strength indicative of a maximum folding angle of the flexible touchscreen; and
      determine a folding angle of the first portion of the flexible touchscreen with the second portion of the flexible touchscreen around the folding axis based on the current strength in the folding area.

15. The device of claim 14, wherein the program further comprises instructions to:
   determine a baseline strength of the flexible touchscreen;
   determine differences between the baseline strength and the self-capacitances sensed in the folding area; and
   determine the current strength of the flexible touchscreen by adding the absolute value of the two greatest differences between the baseline strength and the self-capacitances in the folding area.

16. The device of claim 15, wherein the program further comprises instructions to perform an auto tune of the flexible touchscreen to determine the baseline strength of the flexible touchscreen.

17. The device of claim 14, wherein the program further comprises instructions to:
   map a first folding angle to a first strength sensed across the folding area;
   map a second folding angle to a second strength sensed across the folding area, the first fold angle and the second folding angle corresponding to predetermined rotational positions of the flexible touchscreen around the folding area;
   determine a slope between the mappings; and
   determine the folding angle based on the slope and the current strength.

18. The device of claim 14, wherein the program further comprises instructions to:
   determine that folding angle of the first portion of the flexible touchscreen is greater than a minimum folding angle; and
   in response to determining that the folding angle of the first portion of the flexible touchscreen is greater than the minimum folding angle, reporting the folding angle to a host of the device; or
   determine that the folding angle of the first portion of the flexible touchscreen is less than a maximum folding angle; and
   in response to determining that the folding angle of the first portion of the flexible touchscreen is less than the maximum folding angle, reporting the folding angle to a host of the device.

19. The device of claim 14, wherein the program further comprises instructions to determine the current strength sensed by the flexible touchscreen in the folding area is generated by folding or unfolding the flexible touchscreen based on mutual strength profiling or self-strength profiling.

* * * * *